(12) United States Patent
Hayduk

(10) Patent No.: US 8,875,950 B2
(45) Date of Patent: Nov. 4, 2014

(54) DISPENSER MIXING MODULE AND METHOD OF ASSEMBLING AND USING SAME

(75) Inventor: Matthew Hayduk, Glen Cove, NY (US)

(73) Assignee: Pregis Intellipack Corp., Tulsa, OK (US)

( * ) Notice: Subject to any disclaimer, the term of this patent is extended or adjusted under 35 U.S.C. 154(b) by 470 days.

(21) Appl. No.: 12/436,503

(22) Filed: May 6, 2009

(65) Prior Publication Data

US 2009/0218366 A1 Sep. 3, 2009

Related U.S. Application Data

(62) Division of application No. 10/623,716, filed on Jul. 22, 2003, now Pat. No. 7,552,847.

(60) Provisional application No. 60/468,942, filed on May 9, 2003, provisional application No. 60/469,038, filed on May 9, 2003.

(51) Int. Cl.
*B67B 1/00* (2006.01)
*B29B 7/76* (2006.01)
*B29K 75/00* (2006.01)

(52) U.S. Cl.
CPC ........... *B29B 7/7684* (2013.01); *B29K 2075/00* (2013.01); *B29B 7/7663* (2013.01); *B29B 7/7678* (2013.01)
USPC .... 222/153.09; 222/1; 222/145.1; 222/145.5; 222/509; 222/504; 222/153.01

(58) Field of Classification Search
USPC ........ 222/145.1, 145.2, 145.5, 148, 149, 509, 222/1, 153.01, 153.09, 504; 239/112, 414; 422/133
See application file for complete search history.

(56) References Cited

U.S. PATENT DOCUMENTS

| 2,890,836 A | 6/1959 | Gusmer et al. |
| 3,144,210 A | 8/1964 | Levy |

(Continued)

FOREIGN PATENT DOCUMENTS

| AT | 349 744 | 4/1979 |
| DE | 28 38 772 | 3/1980 |

(Continued)

OTHER PUBLICATIONS

PCT Notification of Transmittal of the International Search Report and the Written Opinion of the International Searching Authority, or the Declaration (Form PCT/ISA/220) mailed Oct. 27, 2004 for Application No. PCT/US2004/014420.

(Continued)

*Primary Examiner* — Frederick C Nicolas
*Assistant Examiner* — Bob Zadeh
(74) *Attorney, Agent, or Firm* — Smith, Gambrell & Russell LLP

(57) ABSTRACT

A mixing module that includes a mixing chamber formed of a cold flow material and placed within a housing which includes a compression device for compressing the cold flow material through which extends a reciprocating rod, preferably in the form of a valve rod relative to one or more chemical ports formed in the mixing chamber to mix or deliver chemicals within a mixing reception recess. The mixing chamber features a locking arrangement between the cold flow material mixing chamber and the housing which acts to prevent movement of the mixing chamber within the housing due to a sticking of the reciprocating rod to the mixing chamber which otherwise produces a position change in the mixing chamber as the compression device is temporarily compressed until the rod be comes unstuck and releases. The invention also includes an open front and rear end housing with releasable front and rear caps allowing easy insertion of the mixing chamber preferably having an annular front end rim as the locking member for receipt within a corresponding recess in the housing.

30 Claims, 38 Drawing Sheets

(56) References Cited

U.S. PATENT DOCUMENTS

| | | | | |
|---|---|---|---|---|
| 3,263,928 | A | 8/1966 | Gusmer | |
| 3,687,370 | A | 8/1972 | Sperry | |
| 3,876,145 | A | 4/1975 | Gusmer et al. | |
| 3,945,569 | A * | 3/1976 | Sperry | 239/112 |
| 4,043,486 | A | 8/1977 | Wisbey | 222/134 |
| RE29,665 | E | 6/1978 | Gusmer et al. | |
| 4,377,256 | A | 3/1983 | Commette et al. | |
| 4,426,023 | A * | 1/1984 | Sperry et al. | 222/132 |
| 4,469,251 | A | 9/1984 | Sperry et al. | |
| 4,550,863 | A | 11/1985 | Farrey | 222/145.8 |
| 4,568,003 | A | 2/1986 | Sperry et al. | |
| 4,674,268 | A | 6/1987 | Gavronsky et al. | |
| 4,708,292 | A * | 11/1987 | Gammons | 239/414 |
| 4,800,708 | A | 1/1989 | Sperry | |
| 4,854,109 | A | 8/1989 | Piarer et al. | |
| 4,858,789 | A * | 8/1989 | Breault et al. | 222/309 |
| 4,860,925 | A * | 8/1989 | Carrillon | 222/145.4 |
| 4,867,346 | A | 9/1989 | Faye et al. | |
| 4,898,327 | A | 2/1990 | Sperry et al. | |
| 4,993,596 | A | 2/1991 | Brown | 222/145.5 |
| 4,999,975 | A | 3/1991 | Willden et al. | |
| 5,050,776 | A | 9/1991 | Rosenplanter | |
| 5,090,814 | A | 2/1992 | Petcen | |
| 5,104,006 | A | 4/1992 | Brown | |
| 5,163,584 | A | 11/1992 | Huber et al. | |
| 5,180,082 | A | 1/1993 | Cherfane | |
| 5,186,905 | A * | 2/1993 | Bertram et al. | 422/133 |
| 5,211,311 | A | 5/1993 | Petcen | |
| 5,219,097 | A | 6/1993 | Huber et al. | |
| 5,255,847 | A | 10/1993 | Sperry et al. | 239/112 |
| 5,265,761 | A | 11/1993 | Brown | |
| 5,299,740 | A | 4/1994 | Bert | |
| 5,312,596 | A | 5/1994 | Proksa et al. | |
| 5,362,342 | A | 11/1994 | Murray et al. | |
| 5,375,743 | A * | 12/1994 | Soudan | 222/145.5 |
| 5,462,204 | A * | 10/1995 | Finn | 222/137 |
| 5,499,745 | A | 3/1996 | Derian et al. | 222/136 |
| 5,709,317 | A | 1/1998 | Bertram et al. | |
| 5,727,370 | A | 3/1998 | Sperry | 53/472 |
| 5,791,522 | A | 8/1998 | Lee et al. | |
| 5,950,875 | A * | 9/1999 | Lee et al. | 222/145.5 |
| 5,964,378 | A | 10/1999 | Sperry et al. | 222/145.2 |
| 5,996,848 | A | 12/1999 | Sperry et al. | |
| 6,283,329 | B1 | 9/2001 | Bezaire et al. | |
| 6,311,740 | B1 | 11/2001 | Sperry et al. | |
| 6,315,161 | B1 * | 11/2001 | Bezaire et al. | 222/1 |
| 6,929,193 | B2 | 8/2005 | Ruddy | 239/112 |
| 7,156,260 | B2 | 1/2007 | Hayduk | |
| 7,182,221 | B2 | 2/2007 | Hanna et al. | |
| 7,222,753 | B2 | 5/2007 | Hayduk | |
| 7,552,847 | B2 | 6/2009 | Hayduk | |

FOREIGN PATENT DOCUMENTS

| | | |
|---|---|---|
| WO | 2004/101243 A2 | 11/2004 |
| WO | WO 2004/101244 | 11/2004 |

OTHER PUBLICATIONS

PCT International Search Report (Form PCT/ISA/210) mailed Oct. 27, 2004 for Application No. PCT/US2004/014420.

English translation of the PCT Written Opinion of the International Searching Authority (Form/ISA/237) mailed Oct. 27, 2004 for Application No. PCT/US2004/014420.

"Speedy Packer Mixing Block Maintenance Procedure", Sealed Air Corporation, 1998 (2 sheets).

AccuPak® Menu Direct Polyurethane Foam Packaging System, Flexible Products Company, (29 pages) (Nov. 1998).

Flexible Products "AccuPak Menu Direct", Supplemental Information Attachment I, AccuPak Menu Direct Wiring Diagram (1 page) with two pages of additional information under the heading "AccuPak 24—Heater Control Settings" (date not available).

Flexible Products "AccuPak Menu Direct", Supplemental Information Attachment II, Heater Assembly (heated channel hose and wire connector interchange) (3 pgs) (date not available).

Flexible Products "AccuPak Menu Direct", Supplemental Information Sheet, Attachment III, Manifold and Tubing Assembly Schematic (date not available).

SpeedyPacker™ Foam-In-Bag Packaging System, User's Guide, Sealed Air Corporation, dated Jul. 2, 1996.

AccuFlow 20D, Electronic Manual, Flexible Products Company, Revised Oct. 21, 1998, (38 pages).

Instapak 901/970 Foam Packaging System, User's Guide, (1998).

Allied Motion, Emoteq Corp., Engineered Motion Technology Brushless Motors and Drives, dated pulled from internet 2/20/23, file:// C:\Documents%20and%20Settings\Administrator\Local%Settings\Temp\GW}000 . . . (4 pgs).

Faulhaber, Brushless DC Motor Information, pulled from internet Apr. 23, 2002, www.micromo.com (1 page).

\* cited by examiner

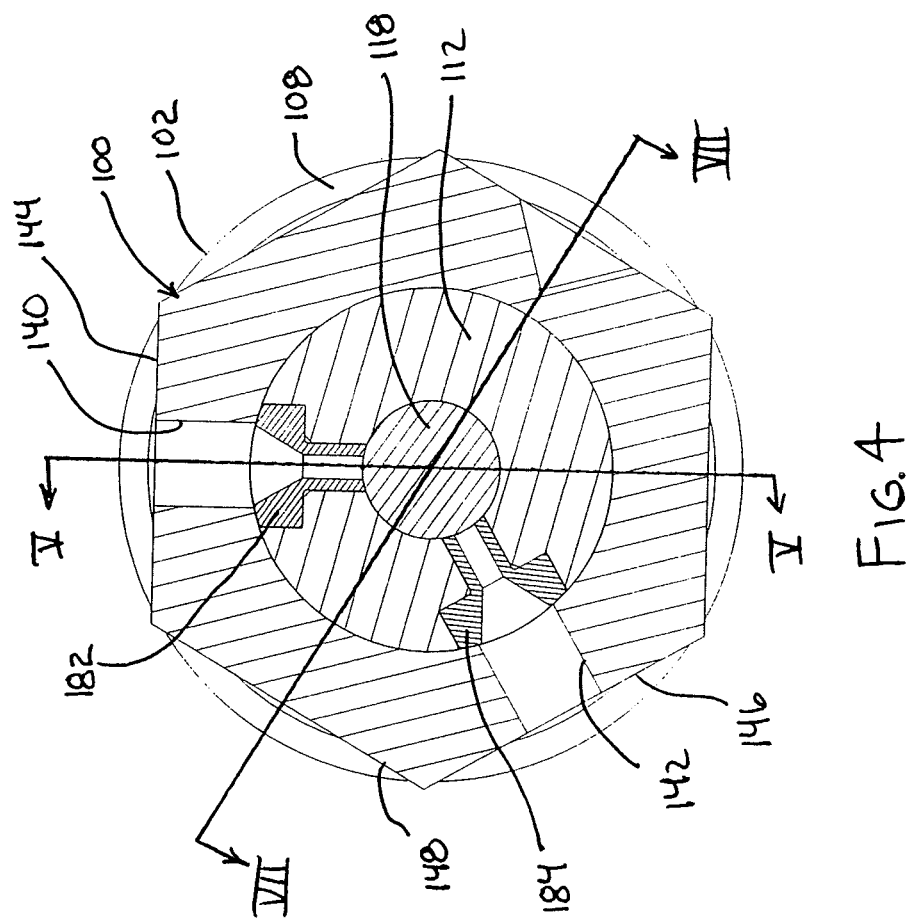

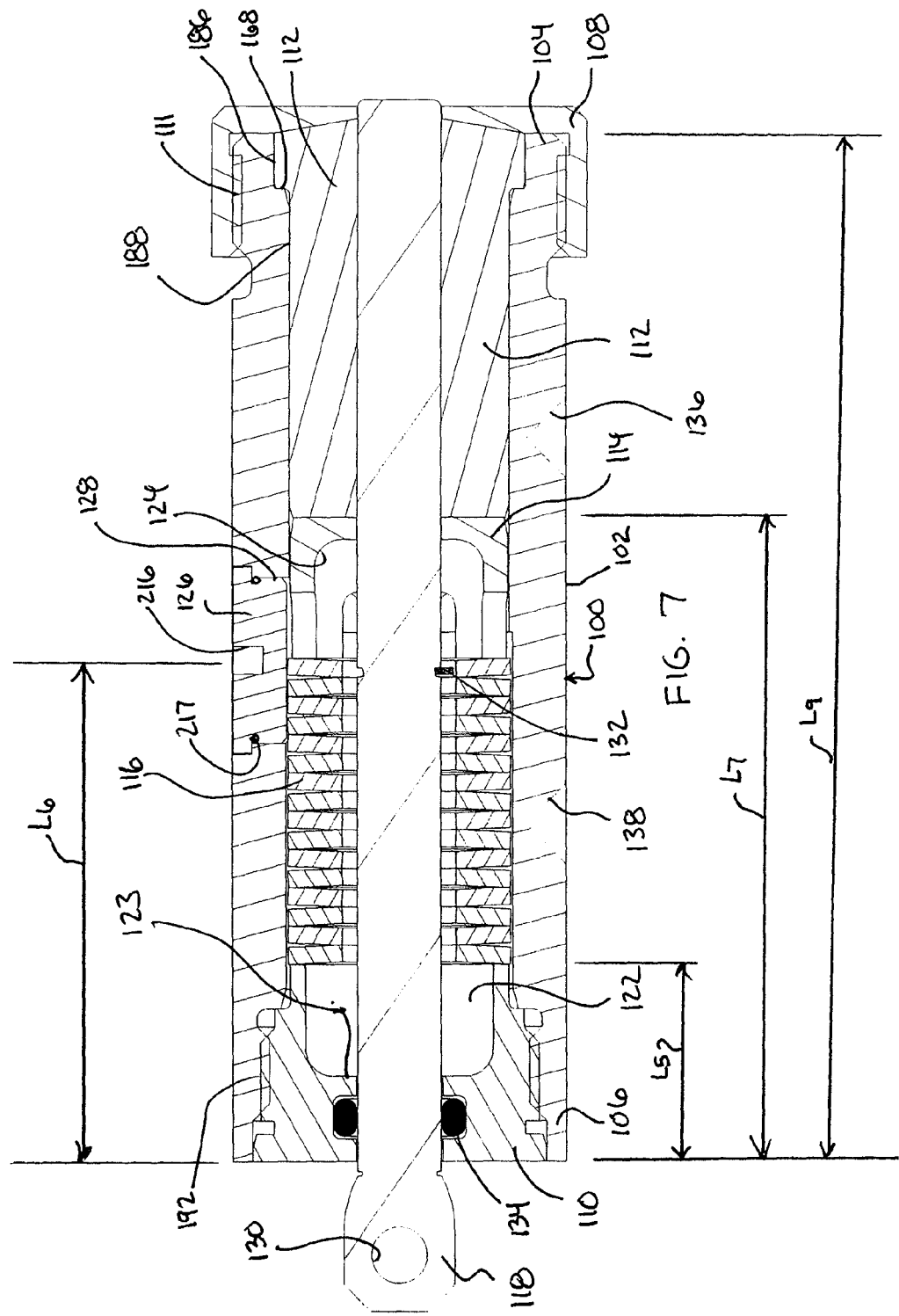

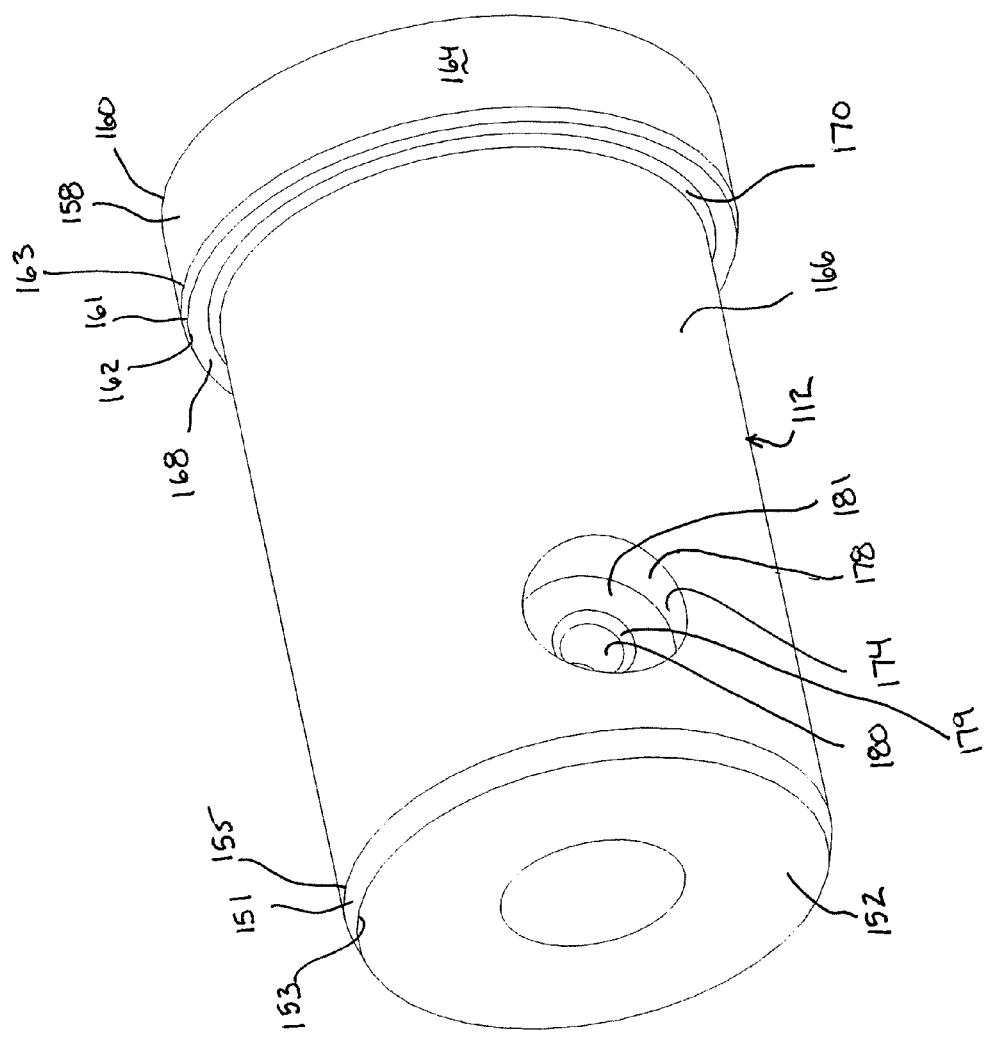

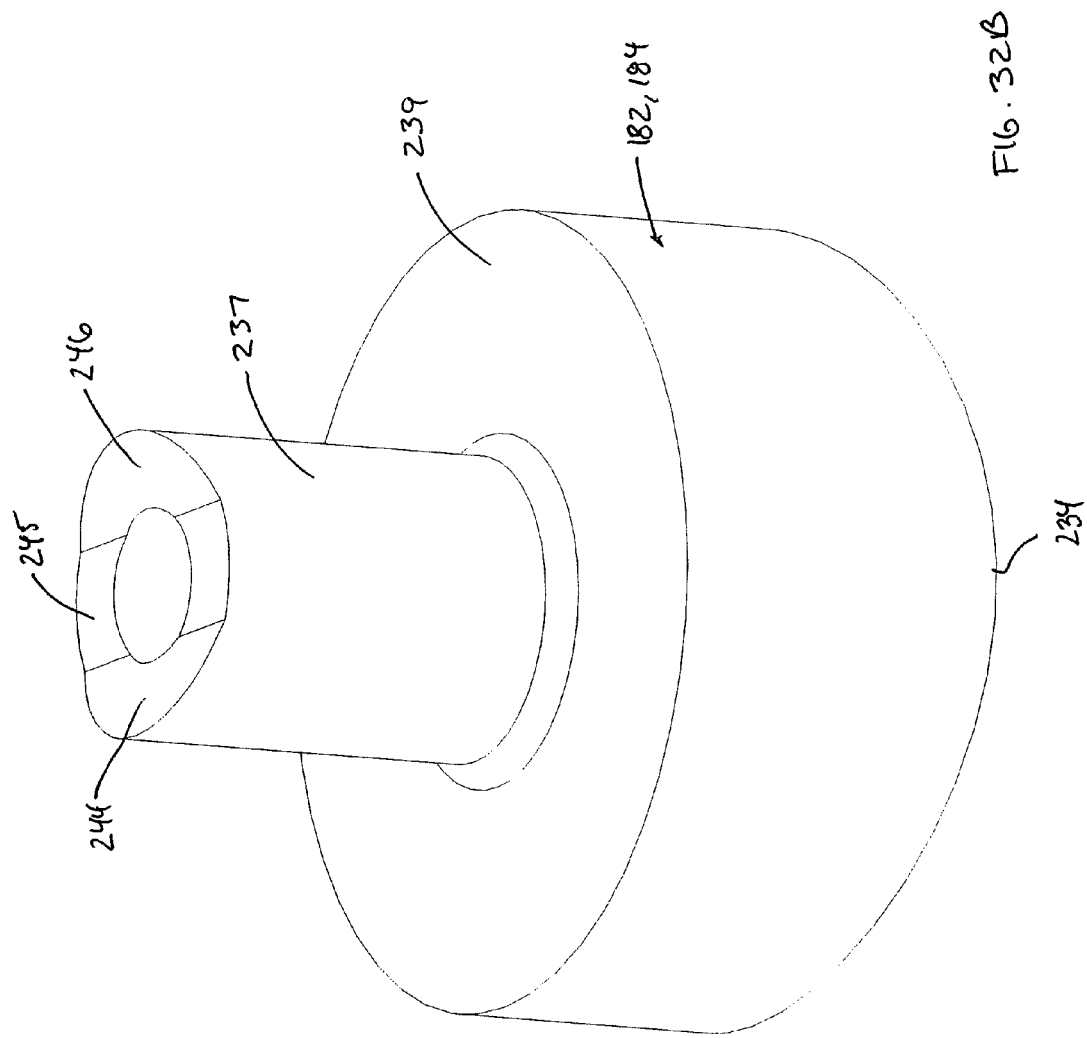

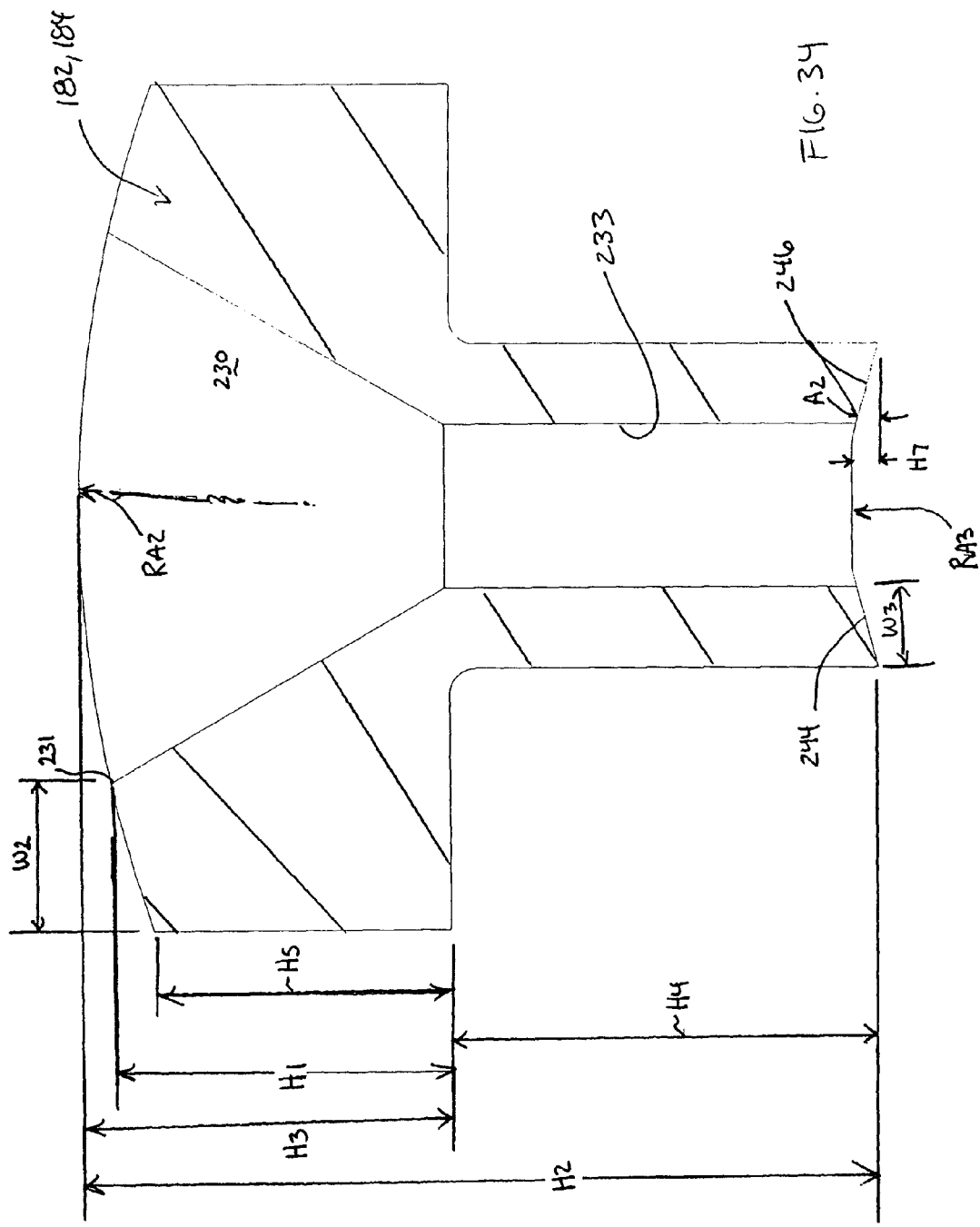

DISPENSER MIXING MODULE AND METHOD OF ASSEMBLING AND USING SAME

CROSS-REFERENCE TO PRIORITY APPLICATIONS

The present invention is a divisional of U.S. application Ser. No. 10/623,716, filed Jul. 22, 2003, which claims priority under 35 U.S.C. §119(e) to U.S. Provisional Application No. 60/468,942 filed on May 9, 2003 and U.S. Provisional Application No. 60/469,038 filed on May 9, 2003, and each of the above identified applications are incorporated herein by reference in their entirety.

FIELD OF THE INVENTION

The present invention is directed at a method and apparatus for dispensing material such as foam for use in, for example, the formation of foam cushion bags or in a more direct application of the dispensed foam, as in a foam in place packaging protection process or injection of foam material within a confined area such as in an insulation injection process.

BACKGROUND OF THE INVENTION

Over the years a variety of material dispensers have been developed including those directed at dispensing foamable material such as urethane foam. For example, when certain chemicals are mixed together they form polymeric products while at the same time generating gases such as carbon dioxide and water vapor. If those chemicals are selected so that they harden following the generation of, for example, carbon dioxide and water vapor, they can be used to form "hardened" (e.g., a cushionable quality in a proper fully expanded state) polymer foams in which the mechanical foaming action is caused by the gaseous carbon dioxide and water vapor leaving the mixture.

In some techniques, synthetic foams are formed from liquid organic resins and polyisocyanates in a mixing chamber (e.g., a liquid form of isocyanate, which is often referenced in the industry as chemical "A", and a multi-component liquid blend such as one including polyurethane resin for producing polyurethane foam, which is often referenced in the industry as chemical "B"). The mixture can be dispensed into a receptacle, as in a package or a foam in place bag (see e.g., U.S. Pat. Nos. 4,674,268, 4,800,708 and 4,854,109 which are incorporated by reference), where it reacts to form the foam.

A particular problem associated with certain foams as in polyurethane foams is that once mixed, the organic resin and polyisocyanate generally react relatively rapidly so that the resultant foam product tends to accumulate in all openings through which it passes, including a backing up of foam into openings through which the components passed before mixing. Furthermore, some of the more useful polymers that form foamable compositions are adhesive. As a result, the foamable composition, which is often dispensed as a somewhat viscous liquid, tends to adhere to objects that it strikes and then harden in place. Many of these adhesive foamable compositions tenaciously stick to the contact surface making removal particularly difficult.

Solvents are often utilized in an effort to remove the hardened foamable composition from surfaces not intended for contact, but even with solvents (particularly when considering the limitations on the type of solvents suited for worker contact or exposure) this can prove to be a difficult task. The undesirable adhesion can take place in the general region where chemicals A and B first come in contact (e.g., a dispenser mixing chamber) or an upstream location as in individual injection ports in light of the expansive quality of the mix, or downstream such as a dispensing gun or, in actuality, anywhere in the vicinity of the dispensing device upon, for instance, a misaiming, misapplication or leak (e.g., a foam bag with leaking end or edge seal). For example, a "foam-up" in a bag dispenser, where the mixed material is not properly confined within a receiving bag, can lead to foam hardening in every nook and cranny of the dispensing system making complete removal not reasonably attainable particularly when considering the configuration of the prior art systems. A misdirected stream from a hand held gun outlet can also end up covering numerous unwanted surfaces.

Because of this adhesive characteristic, steps have been taken in the prior art to attempt to preclude contact of chemicals A and B at non-desired locations as well as precluding the passage of mixed chemicals A/B from traveling to undesired areas or from dwelling in areas such as the discharge passageway used in aiming the A/B chemical mixture. Examples of injection systems for such foamable compositions and their operation are described in U.S. Pat. Nos. 4,568,003 and 4,898,327, and incorporated entirely herein by reference. As set forth in both of these patents, in a typical dispensing cartridge, the mixing chamber for the foam precursors is a cylindrical core having a bore that extends longitudinally there through. The core is typically formed from a fluorinated hydrocarbon polymer such as polytetrafluoroethylene ("PTFE" or "TFE"), fluorinated ethylene propylene ("FEP") or perfluoroalkoxy ("PFA"). Polymers of this type are widely available from several companies, and one of the most familiar designations for such materials is "Teflon", the trademark used by DuPont for such materials. For the sake of convenience and familiarity, such materials will be referred to herein as "Teflon", although it will be understood that the materials available from companies other than DuPont and of other types can also be used if otherwise appropriate.

In the aforementioned systems, a plurality of openings (usually two) are arranged in the core in communication with the bore for supplying the organic resin and polyisocyanate to the bore, which acts as a mixing chamber. A combination valving and purge rod is positioned to slide in a close tolerance, "interference", fit within the bore or mixing chamber to control the flow of organic resin and polyisocyanate from the openings into the bore and the subsequent discharge of the foam from the cartridge.

With hand held and foam-in-bag dispensing apparatus there is typically provided chemicals A/B from their respective sources (typically a large container such as a 55 gallon drum for each respective chemical) in the desired state (e.g., the desired flow rate, volume, pressure, and temperature). Thus, even with a brand new dispenser, there are additional requirements involved in attempting to achieve a desired foam product. Under the present state of the art a variety of pumping techniques have arisen as in individual pumps designed for insertion directly into the chemical source containers coupled with a controller provided in an effort to maintain the desired flow rate characteristics through pump control.

FIG. 1 illustrates an (electric) hand held two component prior art dispensing system 20. System 20 includes chemical drums 22, 24 for the two chemical components "A" and "B" to be mixed to produce a dispensed foam. Pumps 26, 28 extend within the drums "A" and "B" each pump having a combination tachometer and a DC motor set (27, 29). Pumps 26, 28 are each wired to control console 30. Chemical conduits 32, 34 extend from the pumps, through hanging support structure 36 and are connected to hand held dispenser 38. Heater wire coils are present in each of conduits 32, 34, to control chemical temperature, and electric lines 31, 33 extend from the control console and into electrical connection with the heater wire coils in the conduits. Electric line 35 extends from the control console to the electric valve rod reciprocation motor of the dispenser. Adjacent dispenser 38, there is positioned stand 40 for supporting box 42 and a dispenser holster 44. Dispensing system 20 is a closed loop control system with positive displacement pumps which attempt to maintain "on ratio" delivery for every dispenser "shot" activation by continuously monitoring and adjusting temperature, pressure and pump speed.

FIG. 2 provides an exploded view of prior art hand held dispenser 38 which comprises handle 46 having hand grasp extension 48 and mounting base 50 supporting valve rod reciprocation motor 52, mixing cartridge "below" carrier 54 and mixing cartridge "upper" carrier 56. Carriers 54 and 56 are design to retain in position mixing cartridge assembly 58. Lower carrier 54 also functions as a manifold for chemicals received via hose adaptor fittings 60, 62 and receives valve control plugs 64, 66, filter assemblies 68, 70, and O-rings 71, 73 for avoiding chemical leakage between the lower carrier outlet (72 one shown) and cartridge assembly's housing ports (74—one shown). Chemical mixing cartridge 58 is clamped between lower carrier 54 and upper carrier 56, which are secured together by fasteners 76, while cartridge position fixation screws 78 extend into fixing cavities 80, in 80' cartridge assembly 58.

FIGS. 3A and 3B provide an illustration of the interior of prior art mixing cartridge assembly 58 (see U.S. Pat. No. 4,898,327 sharing similarities with that shown in FIG. 2. As shown, the prior art cartridge assembly 58 includes housing 82 with accessible rear end 84 (C-Clip), apertured front end 86, Teflon mixing chamber 88 which defines chemical mixing area 89 (the actual "mixing chamber"), chemical A and B mixing chemical port members 90, 92 (FIG. 3B) receiving chemical from housing port inlets 91, 93, and valve rod 94. In an effort to maintain a sealing relationship with the valve rod, Belleville washer stack 96 pushes against the intermediate disk 98 to maintain the Teflon material compressed. After packing, the open rear end is closed by way of a special pressing tool (not shown) which allows for the end cap 91 and clip 84 to be positioned.

Despite a great deal of effort in the art (e.g., see, for example, U.S. Pat. Nos. 4,469,251; 4,867,346; 5,211,311; 5,090,814; 5,180,082; 5,709,317) the prior art mixing cartridges need to be serviced and replaced with a great deal of frequency causing a corresponding large amount of wasteful operator down time and operator frustration.

In these prior art devices the actual mixing takes place in the cylindrical hole or cavity that is drilled through the central axis of the Teflon cylinder. Thus, the mixing region chamber is actually a hole surrounded by the inside diameter of the relatively thick walled Teflon cylinder (it is noted that the term "mixing chamber" is often used in the art in a broader sense, to include the chamber forming structure). The cavity or bore is where both urethane components A and B impinge, mix, and start the reaction process that creates foam.

Functional prior art foam-dispensers that employ a Teflon mixing chamber such as those listed above are customarily made from various grades of Teflon, because of its superior non-stick properties. The mixing chambers such as those in the patents noted above are generally cylindrical in shape and compressed against the front of the housing. Desirable features of a mixing chamber in most settings include, (i) maximizing mixing efficiency; (ii) providing a laminar output stream; (iii) providing leak free valving in the chemical flow.

The mixing chambers of the prior art are generally designed to provide mechanical support to impingement ports used to aim the chemical being ejected. One purpose of these chemical ports is to focus the flow of liquid precursors for high impingement velocity in an effort to enhance efficiency. The nozzles that the chemicals pass through just prior to entering the mixing chamber itself are commonly called ports in the industry. These ports help to minimize the cross-sectional area of the output jet, maximizing flow velocity, and thereby maximizing impingement pressure when the two streams collide. The exit diameter of the port nozzle opening is designed in these systems with an understanding the opening should not to be smaller than the pressure output capacity of the pumping system (e.g., 200 to 300 psi range which might be deemed a comfortable operational level, with a 400 to 500 psi range being representative of a practical prior art system maximized pressure level). Mixing can possibly be enhanced by using additional mechanical mixing elements in the system, but these can add significant complexity to the design, which can often outweigh any possible mixing advantage.

For greater efficiency (and foam quality), maintenance of both ports clean and unobstructed allows for retention of initial production settings. Maintaining the ports properly aligned to impinge at the desired location as in the centerline of the mixing chamber is also generally considered as being desirable under the prior art systems.

With respect to a laminar output stream, the length of the mixing chamber channel provides a means of damping the turbulence of the chemical flow immediately after impingement. If the turbulence is properly damped there is provided a laminar quality to the flow of (mixed) chemical that exits the reception (mixing) chamber. A laminar output flow, commonly called a "pencil pour", is easier to aim and much cleaner to work with than a turbulent or spinning output stream. If the mixing chamber length to diameter ratio is too small, however, the output stream can be highly erratic. This can be messy for the operator, and is an indication that the chemicals are badly mixed.

Also, it is generally believed in the industry that mixing can be improved in systems having a longer dwell time in the confines of a mixing chamber as the confinement helps keep the chemical components in close proximity for a longer time. On the other hand, if the mixing chamber is too long, the axial force required to retract the valving rod increases significantly, resulting in an increase in the size and weight of the associated drive mechanism. High weights and large size requirement are generally unacceptable for practical application in, for example, hand held packaging systems (e.g., the weight of a hand held dispenser needs to be maintained low for user comfort).

Another source for the development of a non-laminar or erratic flow in prior art systems is having the chemicals not impinge at the geometric centerline of the mixing chamber inside diameter, in that rotational momentum can be imparted to the flow stream in the aforementioned prior art systems. This rotational momentum can manifest itself in a spinning of the output stream, which appears as a spray pattern and can cause various problems.

The mixing chamber in most systems also provides a means for the valving rod to shut off the flow of liquid precursors and to open up to allow flow and mixing to occur. Thus, an effort is made in prior art systems to maintain valve arrangements that avoid the formation of highly problematic leak paths that can allow the A chemical to mix with the B chemical at undesirable times and locations. Since Teflon is a marginal sealing material, however, it is quite difficult to provide the necessary sealing in the pressure range of typical interest (e.g., 200 to 500 psi). Compression of the Teflon can potentially improve its function as a seal. For example, compression with a psi loading three to four times greater than the fluid pressure being sealed. A stack of Belleville washer at the back of the housing has been used to provide this load.

Also, Teflon seals have the potential for improving with time under load, as over time the Teflon material can cold-flow into the microscopic surface imperfections that are potential leak paths along the face of a sealing surface. Teflon material has more cold-flow tendency than most other engineering plastics because the polymer strings that comprise the material do not stick to each other. Because of this, areas of Teflon material are free to slide past each other, to an extent greater then most other engineering plastics, making Teflon material a useful non-stick surface.

While this cold flow distortion of the Teflon can be beneficial (e.g., allowing for the conformance of material about surfaces intended to be sealed off) it is also a cause of several problems, including the potential for the loss of the fit between the bore and the valving rod as well as the fit between the openings (e.g., ports) through which the separate precursors enter the bore for mixing and then dispensing. In many of the prior art systems utilizing Teflon, the Teflon core is fitted in the cartridge under a certain degree of stress in order to help prevent leaks in a manner in which a gasket is fitted under stress for the same purpose. This stress also encourages the Teflon to creep into any gaps or other openings that may be adjacent to it which can be either good or bad depending on the movement and what surface is being contacted or discontinued from contact in view of the cold flow.

Under these prior art systems, however, over time the sealing quality of the core is lost at least to some extent allowing for an initial build up of the hardenable material which can lead to a cycle of seal degradation and worsening build up of hardened material. This in turn can lead to a variety of problems including the partial blockage of chemical inlet ports so as to alter the desired flow mix and degrade the quality of foam produced. In other words, in typical injection cartridges the separate foam precursors enter the bore through separate entry ports. Polyurethane foam tends to build up at the area at which the precursor exits the port and enters the mixing chamber. Such buildups cause spraying in the output stream, and dispensing of the mixture in an improper ratio. The build up of hardened material can also lead to partial blockage of the dispenser's exit outlet causing a misaiming of the dispensed flow into contact with an undesirable surface (e.g. the operator or various nooks and crannies in the dispenser).

The build-up of hardened/adhesive material over time leads to additional problems such as the valve rod becoming so adhered within its region of seal/no-seal reciprocal travel that either the driver mechanism is unable to move the rod (leading to an oft seen shut down signal generation in many common prior art systems) or a component along the drive train breaks off which is often the valve rod engagement location relative to some prior art designs. Moreover, if the Teflon sealing element is forced to move after it has set at a given position, the quality of sealing, as explained in greater detail below, will be degraded until the Teflon can re-set in the new position.

A disruption of any of the above mixing chamber functions will necessitate service or replacement of the mixing module, with resultant downtime, inconvenience, and expense. Anything that can eliminate or reduce the occurrence of these problems will greatly enhance the reliability of the mixing module.

As a result of studying the aforementioned problems and difficulties associated with the prior art, the inventors have come to the belief that a source of many of the difficulties and problems associated with the prior art devices is the tendency for the mixing chamber to move within the mixing chamber housing. A review has thus been made under the present invention as to the tendency for the chamber to "move around" within the confining cylinder of the mixing chamber housing. The effects of this movement has been observed by the changes in the position of the stainless steel chemical ports of prior art devices (e.g., by looking through the two flow holes that are drilled radially through the outer metal housing). These housing inlet holes provide a clear view of the chemical ports that are located radially in the body of the Teflon mixing chamber. It has been observed that after a few thousand cycles, the ports will usually rotate noticeably with respect to the mixing chamber housing inlet holes and that the shifting tends to get worse with more cycles. This movement problem has been determined to manifest itself in mixing chamber movements in both an axial and a radial direction.

Some examples of the problems considered to exist as a result in the shifting of the mixing chamber within its housing unit, include:

I. Movement of Chemical Ports from Ideal Position
 a. Shifting of the mixing chamber, even by a small increment, causing the ports to move out of their ideal (as designed and assembled) position.
 b. If the A and/or B chemicals ports move out a desired impingement position, foam quality can be affected.
 c. The output stream of reacted chemicals from the exit of the mixing module may spray due to a rotation in the output stream caused by the ports being out of position.
 d. If the rotation is severe, the ports can move to a position so far out of alignment with the flow holes in the housing, that the flow of chemical can be severely restricted, and system shutdown will result.

II. Chemical Leakage
 a. Shifting of the mixing chamber, even by a small increment, can seriously degrade its sealing ability, causing leaks of A and/or B chemical to locations where they can mix and react with each other and cause various problems.
 b. Leaks that cause urethane deposits near the exit areas of the chemical ports can cause the output stream of the mixing module to spray, or even total flow blockage.
 c. If a leak is large enough, it can lead to what is known as a massive crossover, where large amounts of urethane are produced in the A and/or B-sides of the dispenser manifold. Massive crossover in a dispenser manifold are difficult to clean, and often result in the replacement of many expensive components.
 d. Chemical leaks can also cause the valving rod to bond to the mixing chamber. The urethane that forms on the inside diameter of the mixing chamber over time will have a tendency to jam a prior art mechanism. Wherein the drive mechanism can no longer move the rod, causing a sensed system shut down or an equipment breakdown as in a broken rod connector.
 e. Chemical leakage into a solvent source such as a solvent chamber found in a rear of a mixing module, reduces the effectiveness of the solvent, and greatly reduces the life of the mixing module.

III. Premature Wear of the Mixing Chamber
  a. Most mixing modules are based on relatively tight tolerances and fairly critical press fits. Thus, any tolerance deviation caused by movements leakage, can lead to related failures.
  b. If these fits are not held, the mixing chamber, will, in addition to leaking, also, be subjected to damage due to motion of the valving rod. The damage may not be noticeable to the eye, but even microscopic deformations can have noticeable effects.
  c. Any damage or wear to the Teflon mixing chamber will exacerbate the leakage issues noted above.
  d. Damage to the inside diameter surface of the mixing chamber will also create fissures, crevices, and score marks that will be nucleation sites for urethane buildup. Once the urethane buildup gets started, it will attract more urethane to itself, growing in size until it causes a mixing module failure.

The sequence of events is considered under the present invention to be as follows (although it is not the intention under the present invention to be specifically bound or limited in any fashion in the beliefs (e.g., analysis and conclusions) described herein in development of the present application) with the explanation given relative to a typical prior art embodiment using Bellville washer compression:

1. The mixing module starts its life in aligned condition, with the ports in the mixing chamber in good alignment with the through holes in the mixing module housing. As the mixing module is used, urethane naturally builds up on the inside diameter of the mixing chamber.
2. The slow buildup of urethane on the inside diameter of the mixing chamber gradually increases the sticking force between the valving rod and the mixing chamber.
3. At some point, when the bond strength increases to a critical level, the act of retracting the valving rod causes the mixing chamber to move back into the Belleville washers that constrain it from the rear. The stack of Belleville washers is in effect a powerful spring with short travel.
4. The valving rod will move the chamber in the direction of travel, which compresses the Belleville stack. This will increase the force pushing the mixing chamber forward until the urethane bond is broken between the mixing chamber and the valving rod.
5. Once the bond is broken, the Belleville washer forces the mixing chamber forward, to near its original position.
6. If all of this motion were "perfect", the mixing chamber would not rotate, and it would return to its original position. However, the forces in this situation are considered not perfectly balanced, and the mixing chamber tends to rotate as it is pulled back, or as it seeks to return to its home position.
7. The mixing chamber tends to rotate a tiny amount with each cycle. After a large number of cycles, the sum of these minute rotations manifest as a significant change in the radial position of the port inside the mixing chamber housing.
8. These stresses on the chamber also cause it to distort, which may account for the port movement that is apparent in the axial direction with respect to the housing flow holes.

An additional problem associated with the prior art is the difficulty to gain access to the mixing chamber to correct any of the above noted problems that arise. For example, as seen from FIGS. 3A and 3B, prior art mixing modules, have been assembled using clip rings on the back cap or compression cap. In order to install the clip ring, the back cap is forced into the Belleville washer stack, an action that requires about 200 lbf to accomplish. Thus, the prior art method of assembly requires the use of machines like arbor presses and some special holding and alignment fixtures to put the prior art mixing module together. This type of design is difficult to both assemble and disassemble, as the clip ring can be both difficult to install and to remove with the heavy loads involved.

An additional problem associated with the prior art designs featuring an integrated front end cap of the housing is the tendency for the front end cap to deform or bulge out due to the loads exerted by the Belleville washer stack on the mixing chamber and, in turn, on the front end cap abutting the mixing chamber. The prior art front cap swaged onto the housing design is not of particularly high strength and is subject to deformation. This deformation can generate reliability problems and lead to problems as outlined above for when the mixing chamber shifts in position.

The prior art designs also suffer from difficulty in assembly. For example, the typical assembly process includes inserting the mixing chamber from the back end and attempting to line up the chemical ports prior to adding the Bellville washers, compression cap and C-clip. This alignment can be difficult and even if properly achieved the activity associated with locking the C-clip can easily result in misalignment problems. In such events, the user has to undergo a difficult C-clip removal and alignment sequence. The difficult disassembly and assembly also renders prior art devices poorly suited for field repairs and field rebuilds, requiring, instead, return to a service facility and service technician involvement.

An additional problem associated with the prior art design, is the difficulty in properly filling the solvent chamber with solvent. If can be an awkward and messy procedure to fill prior art mixing modules with solvent. For example, under one prior art design the solvent has to be dispensed into the back of the mixing module, just prior to using an arbor press to compress the washers. In additional to spillage during this process it is difficult to know whether the mixing module is sufficiently full of solvent (e.g., because the viscosity of most solvent relied upon is quite high at room temperature it is easy for air to become trapped in the mixing chamber, giving a false impression of a full solvent fill). Once assembled, a check of the solvent cannot be made under the prior art design absent going through the difficult dissembling process. Considering that mixing module life is typically proportional to solvent quantity, the presence of trapped air and low quantity solvent levels can seriously degrade the life of the mixing module.

Once assembled and the C-clip locked, the solvent inside can degrade or degrade internal seals over time. Thus rendering the prior art design ill suited for harsh climates and/or prolonged storage as often involved with military applications.

SUMMARY OF THE INVENTION

Accordingly, the present invention is directed at reducing or obviating at least some of the aforementioned difficulties and problems associated with the prior art. That is, with the assistance of the forgoing insights considered to have been gained, various problems have been addressed under the present invention including those related to the aforementioned movement of the mixing chamber, and, under one embodiment of the invention, a mixing chamber has been developed which comprises a locking device that prevents the mixing chamber from pulling back with a valving rod into the compression means (e.g., a stack of Belleville washers). Thus, under one embodiment of the present invention there is provided locking means to prevent other than beneficial cold-flow mixing chamber material movement relative to its support housing or confinement means. By providing a mixing chamber with position locking means, relative to, for example, valve rod reciprocation, there is prevented or at least minimized any movement (preferably both axial or radial movement precluded) of the mixing chamber of the present invention upon a sticking relationship forming between the rod and mixing chamber while the rod is being pulled back into the compression means.

The locking means of the present invention preferably functions by utilizing the housing as a fixed base, which housing is itself preferably fixed in position relative to the dispenser (e.g., hand held housing or frame supporting mixing module assembly). A mechanical interengagement between the housing or mixing chamber confinement means and the mixing chamber is preferred, as it provides for the locking and removal of the mixing chamber when desired. The locking means is preferably applied about the entire circumference or a significant percentage (e.g., 30% or greater either continuously or in spaced series) of the mixing chamber to provide a degree of equal retention force about a significant portion or the entire circumference or periphery of the mixing chamber. For example, a preferred locking means (which also has the benefit of ease in manufacture and mixing module insertion and removal), is an enlargement of the outside diameter of the distal end of the mixing chamber to match an enlarged inside diameter of the mixing module housing. This "mushroom" configuration in the mixing chamber (e.g., an annular stepped protrusion in a Teflon cold flow material block), is designed to withstand the forces inherent in the dispensing mechanism, and to prevent or at least minimize any tendency for the mixing chamber to move backwards or shift with the rod.

Additional embodiments for the locking means include a reversal of the relative extending or protruding and receiving or recessed locking components or a mixture of both techniques. Again, it is preferable to have a continuous full periphery projection or significantly full circumferentially arranged protrusions directed at preventing the movement of the mixing chamber and undesirable cold flow distribution of mixing chamber material while the mixing chamber is under compression means compression. For example, in a reversed arrangement, the mixing chamber is provided with one or more reception areas receiving radially inwardly extending member(s) either formed in the housing itself such as an integral protrusion or an added locking extension or extensions extending in from or through the housing (e.g., serially arranged pins, an annular ring or the like which are sufficiently circumferentially located as to provide a consistency in locking force against the force of the spring or compression means working against the locking means). The axial positioning of "reversed" or non-reversed mixing chamber movement prevention means of the present invention is set to have the protrusion(s) engage a sufficient axial amount of the mixing chamber to lock the chamber in axial position during valve reciprocation. The housing protrusion(s) in the "reversed" embodiment or the housing reception area(s) in the non-reversed embodiment are either based on a monolithic housing design (e.g., single molded, machined or formed unit) or comprised of a plurality of assembled components (e.g., inserted pin members or compressible annular sleeve or clamp arrangement or an inserted cylindrical sleeve in the non-reversed embodiment to catch the distal end of an axially intermediate mixing chamber protrusion). Accordingly, rather than or in addition to, the above noted mushroom or expanded distal end (the end where there exits the free end of the rod) the locking means of the present invention can be positioned at an intermediate or opposite (proximal end), locking means position. As will became more apparent below (e.g., the description of the loading of a mixing chamber under the new mixing module housing design from the housing front end) the "non-reversed", distal positioned "mushroom" embodiment is preferred.

The design of the preferred embodiment of the invention also features a front end cap and back cap that are releasably secured to respective open ends of the mixing module housing. In a preferred embodiment, the releasable securement is by way of threaded connections at respective-ends of the housing such as an internal thread at the compression end which is preferably the rear end under the present invention and an external thread at the front end with the front end preferably being arranged for finger grip insertion and removal of a front cap and at the rear end a simple tool threading or unthreading of the back cap.

This front cap and rear cap attachment to a front and rear open ended housing design allows for in field servicing and rebuilding. Also, under the design of the present invention, the front cap can be manufactured separately from the housing and made of a robust construction and material. Also, the design of the present invention provides for front end loading and manipulation of the mixing chamber prior to front end cap securement which allows for accurate mixing chamber chemical port alignment with that of the housing prior to front end cap closure (which can take place after or before back cap securement but preferably before the back cap insertion with the back cap insertion being used in a compression cap sense preferably carried out as the final assembly step (except for, optional activity associated with the addition of solvent through a solvent cap opening and securement of the solvent cap as described immediately below)). Port pins or the like can be used to facilitate position maintenance during the final assembly process.

The inclusion of a releasable and securable solvent cap and placement thereof on the housing provides for the benefit of solvent filling taking place after all other components of the mixing module are fully assembled without the spillage problems associated with the prior art and the design makes it easier to properly fill the solvent chamber from the outset as there can more easily be avoided trapped air problems and move easily carried out a monitoring of the solvent level after full assembly.

Despite being a readily accessible solvent input design, solvent containment is assured with the solvent cap with even added assurance provided when a seal such as an O-ring is positioned between the solvent cap and housing threads which further avoids the potential for leaking during shipping. Moreover, the ready access allows for prolonged storage free of solvent and in-field filling at the time of desired usage. Also, when going from usage to a prolonged storage state the solvent can be easily removed and then refilled at the time of reuse.

A preferred embodiment of the invention features a dispenser module comprising a housing, a fluid reception chamber received within the housing and having a rod passageway formed therein and at least one chemical passage port in fluid passage communication with the rod passageway, a rod received in the rod passageway, and locking means for preventing fluid reception chamber adjustment in conjunction with a reciprocation adjustment in position of the rod.

A preferred embodiment of the invention also features a dispenser module in the form of a mixing module wherein the fluid reception chamber is a mixing chamber receiving at least two different chemicals, is formed of a cold flow block of material such as Teflon material, and has a through hole formed therein to define the rod passageway. The mixing module further includes compression means (e.g., a stack of Belleville washers) for imposing compressive forces on the mixing chamber and the rod is dimensioned relative to the mixing chamber such that, in use, despite a rod to chamber sticking relationship being likely (assumed to occur at some point during use) the mixing chamber retains a pre-stick position despite the design of the compression means being such that it is adjustable in configuration or position upon being subjected to the compression.

In the dispenser module, the locking means preferably includes a projection/recess arrangement or relationship formed between the housing and the mixing chamber and providing a generally consistent peripheral or circumferential locking force between the mixing module and housing. For example, the projection/recess relationship preferably includes an annular projection in one of the housing and mixing module, and a receiving recess formed in a corresponding one of said housing and mixing module. A preferred embodiment has the projection formed closer to a first end of the mixing chamber than a second end, and with first end being a front discharge end of the mixing chamber. The projection is preferably also formed at a forward most end portion of the mixing chamber. The compression means is also preferably designed to be continuously in compression mode at all times when the mixing module is assembled.

A preferred embodiment has the mixing chamber with the projection and the housing with the corresponding recess, and the projection extending over at least a majority of a periphery of the mixing chamber, such as one extending continuously without interruption about the mixing chamber periphery. An annular projection ring that extends over the entire periphery of the mixing chamber from the forward most end rearward to a limited longitudinal degree is illustrative of a suitable configuration. Also the projection preferably extends radially outward from a cylindrical main body of the mixing chamber with the projection and main body being formed as an integrated monolithic unit, and with the radial extension (both ends of diametrical extensions considered) preferably representing 5 to 25% of a maximum diameter of the mixing chamber, with 10 to 15% being sufficient for most uses (with half those amount above representing the annular radial distance or one of the two extensions along a diameter for the circumferential flange.

In an alternate embodiment of the mixing module of the present invention, the mixing chamber has a projection that extends about a peripheral area of the mixing chamber and the projection includes multiple projection members arranged about that peripheral area of the mixing chamber.

The present invention also features a dispenser module wherein the rod is dimensioned to seal off an exit opening in the chemical port upon reciprocation of the rod past said exit opening, and wherein there are at least two radially extending chemical ports formed in the mixing chamber and the rod passageway is represented by an axial through passageway in a cold flow block of material forming the mixing chamber. Also, in a preferred embodiment the rod functions both as a valving rod and purging rod and the fluid reception chamber includes two chemical inlet ports that open into the rod passageway for mixing when the rod is in a retracted state and the rod is dimensioned to seal off the chemical inlet ports when in a non-retracted state.

The dispenser module preferably has two or more chemical mixing inlets formed in a main housing and further comprises, in a preferred axial series, a housing back closure member, the compression means, the fluid reception chamber or mixing chamber formed of a cold flow material (and also preferably having at least two chemical inlet ports opening into the rod passageway), and a front closure member. The housing front and back closure members are preferably releasably fixed to the housing with the housing having an open front end and an open rear end, and the front and rear closure members being secured into or over those opening so as to are close off the housings front and rear openings. The front and rear closure members are preferably releasably secured through use of, for example, a threaded engagement with the housing. Also, the fluid reception chamber is preferably formed of Teflon cold flow material and includes two chemical inlet ports which open into the rod passageway and with the housing having chemical feed apertures aligned with those chemical inlet ports.

A preferred embodiment of the invention also features a mixing module for a two chemical component dispenser system, comprising a housing having a reception cavity and front and rear ends, a mixing chamber formed of a cold flow material and received in the housing, and the mixing chamber having first and second chemical ports and a rod passageway formed therein, as well as a rod received in the rod passageway, a compression device which is positioned within the housing in a compression relationship with the mixing chamber (preferably continuously), a front closure cap releasably secured to the front of the housing and having a chemical discharge cavity formed in the front closure cap, and a rear closure cap releasably secured to the rear of the housing and having a rod reception cavity formed in the rear closure cap. A "secured" relationship for this embodiment means able to retain relative position based on inter engagement means such as threads despite external forces acting thereupon with the noted external forces not including any specifically designed removal external forces such as unthreading forces, but does include maintaining position despite the continuous axial force of the compression means on the ends directly or indirectly.

Preferably, at least one of the front and rear closure caps are in threaded engagement with the housing, with a preferred embodiment having each of the front and rear closure caps releasably secured such as one where each is in threaded engagement with a respective end of the housing. Preferably the front closure cap is secured to the housing so as to be hand removable without tools and wherein the rear closure cap has tool engagement means for facilitating tool removal of the rear closure cap from the housing, or vice versa.

The mixing module of the noted embodiment has a mixing chamber that includes rod stick movement prevention means for preventing movement of the mixing chamber with the rod as a unit relative to the compression means when the rod becomes stuck to the mixing chamber during operation. A preferred rod stick prevention means features male/female locking members associate with the mixing chamber and/or housing and which are positioned to preclude axial movement of the mixing chamber as a whole within the housing. Also, the male locking member can include an annular front ring extension provided in the mixing chamber which is received within an annular female recessed section of a front region of the housing which recessed section defines a locking wall relative to a direction of movement of the mixing chamber opposite to the direction of compressive action being imposed on the mixing chamber.

The housing also preferably includes a solvent fill port opening into the housing and a threaded solvent port cover which is releasably fixed to the housing to facilitate solvent filling and removal. A seal member is further provided to help seal off the solvent port opening in conjunction with the port cover.

The present invention further comprises a mixing module that includes a housing, a mixing chamber formed of a cold flow material and having a chemical inlet port and a rod passageway, and a rod received within the mixing chamber as well as a set of Belleville washers within the housing and in a compression relationship with the mixing chamber, and with the mixing chamber and the housing being in a male/female locking relationship such by way of an annular male projection on one of the housing and mixing module and a corresponding female recess receiving the male projection on an opposite one of the housing and mixing module. An example of a suitable male/female locking relationship includes the mixing chamber having an enlarged forward end forming a male locking member, and the housing having a recess formed in a front end for receiving the enlarged forward end of the mixing module. Furthermore, the mixing module of the present invention preferably features a housing that has open front and rear ends and front and rear closure caps are provided that are designed releasable securement (e.g., threads) them to the housing.

The present invention also features a method of assembly a mixing module that includes inserting into a housing (i) compression means, (ii) a reciprocating rod, (iii) a mixing chamber, with the latter receiving the rod and being placed in a state of compression by the compression means, and releasably attaching to the open front and rear ends of the housing respective front end and back caps with the front and back caps having a rod passageway opening formed therein. The method further includes arranging for locking means locking between the mixing chamber and the housing to prelude mixing chamber movement despite a rod stick relationship between the rod and the mixing chamber. The method also preferably features assembling the device such that a forward face of the mixing chamber contacts on inner surface of the front cap and the rear cap is threaded on after the front cap is inserted onto the front end of the housing.

A preferred method further comprising providing solvent into a solvent opening formed in the mixing module housing and plugging the opening with a solvent opening plug cap. The preferred method featuring the insertion of solvent (e.g., heated to above room temperature or above 100° F. as in 130° F.) after both the front cap and rear cap or closed off by a prior releasable attachment of the front end rear caps.

The present invention also includes a method of dispensing comprising preventing relative movement of a mixing chamber and the housing receiving that mixing chamber despite a sticking together of a valving rod reciprocating within the mixing chamber and despite the potential for movement of compression means compressing the mixing chamber were if not for the locking means, and with the compression means imposing compressive forces continuously on the mixing chamber following assembly and the locking forces being designed to avoid uneven application chamber relative to the periphery of the mixing.

BRIEF DESCRIPTION OF PREFERRED EMBODIMENTS

Many aspects of the invention can be better understood with reference to the following drawings, with emphasis being placed upon illustrating the principles of the present invention. Moreover, in the drawings, like reference numerals designate corresponding parts throughout the several views.

FIG. 1 shows a two component, hand held prior art dispensing system for dispensing foam.

FIG. 2 provides an exploded view of the dispenser used in the system in FIG. 1.

FIG. 4 shows a cross-sectional view of a mixing module of the present invention taken along cross-section line IV-IV in FIG. 5.

Figure 6:
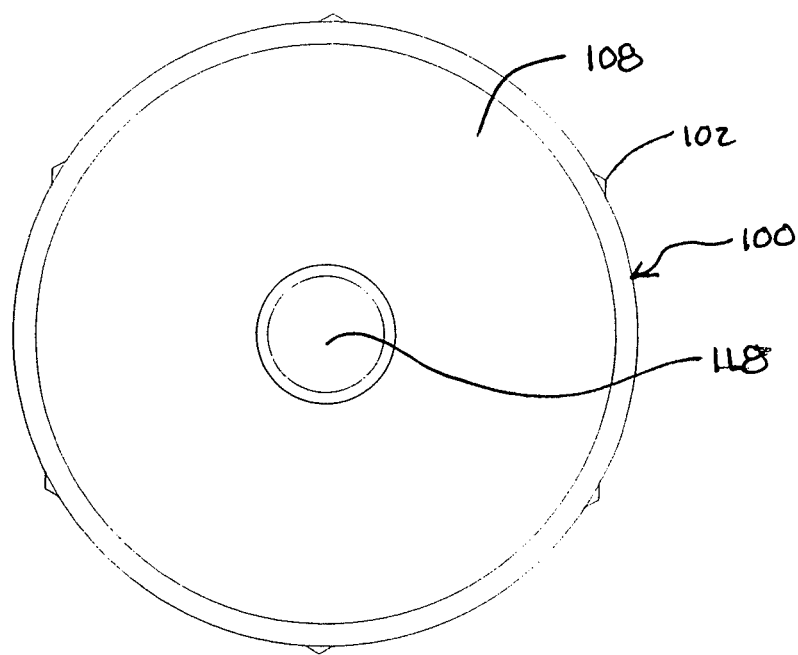

FIG. 6 provides a front end elevational view of the mixing module of the present invention.

FIG. 7 provides a cross-sectional view of the mixing module taken along cross-section line VII-VII in FIG. 4.

Figure 8A:
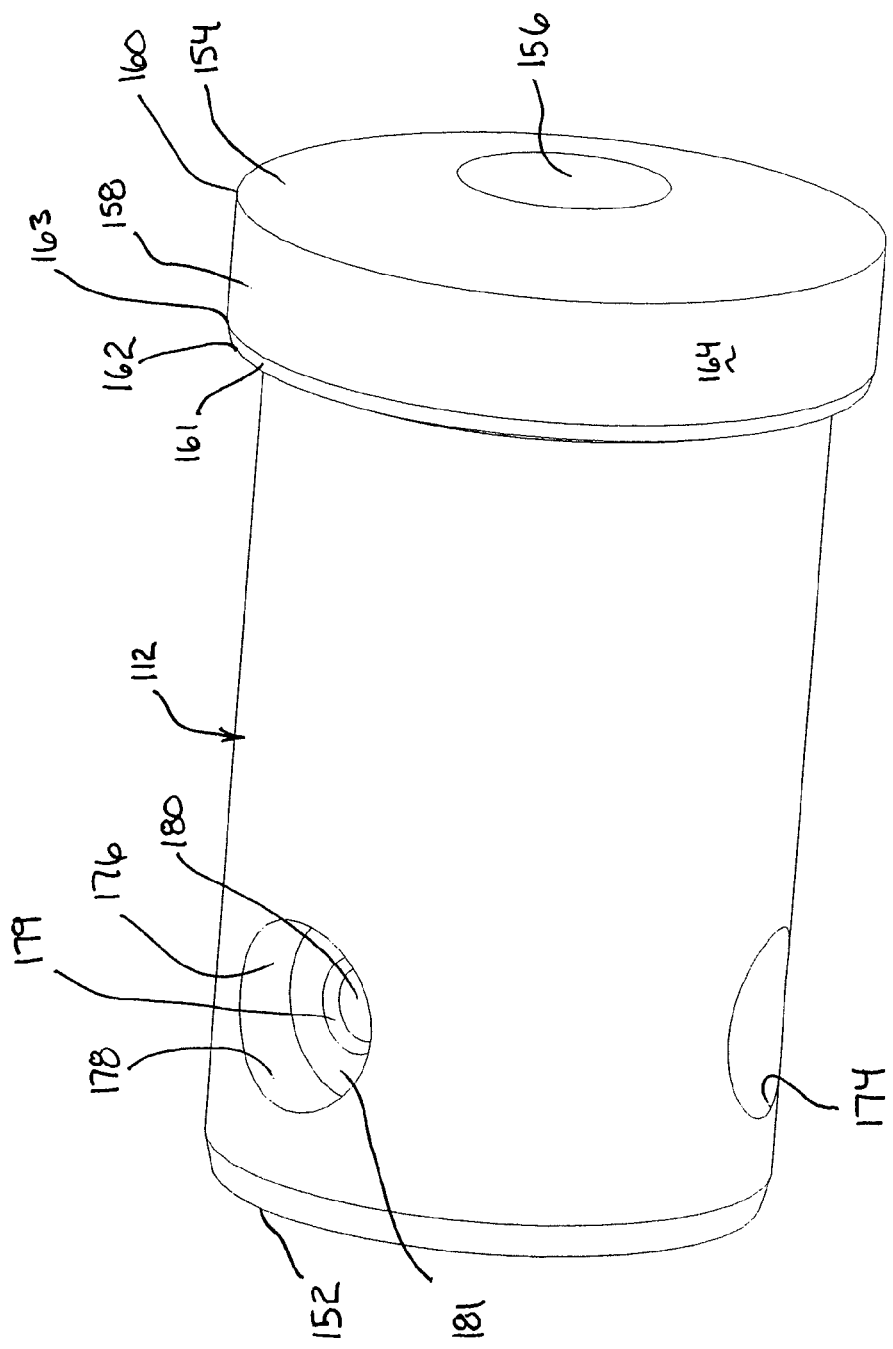

FIGS. 8A and 8B provide different perspective views of the mixing chamber of the present invention.

Figure 8C:
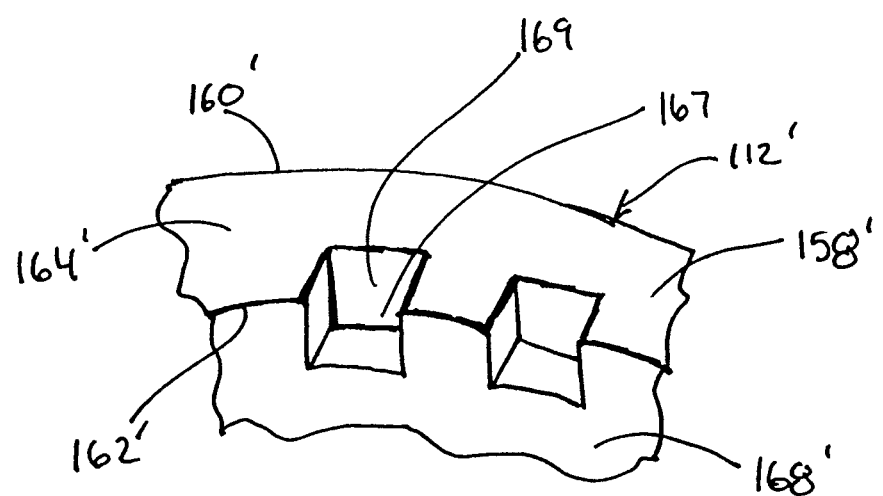
Figure 8D:
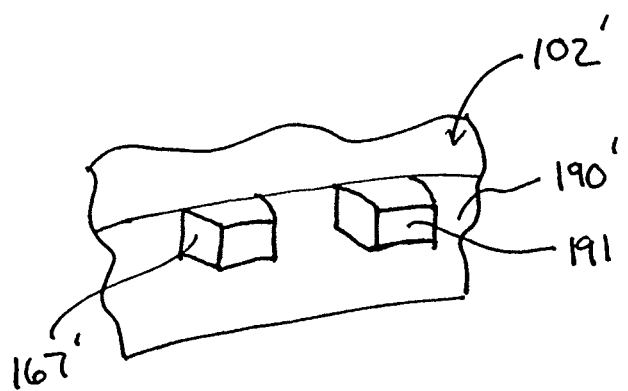

FIG. 8C provides a partial front view illustration of a non-continuous, multi-protrusion locking means under the present invention FIG. 8D provides a cut-away perspective illustration of the female recessed portion of the locking arrangement of FIG. 8C.

Figure 9:
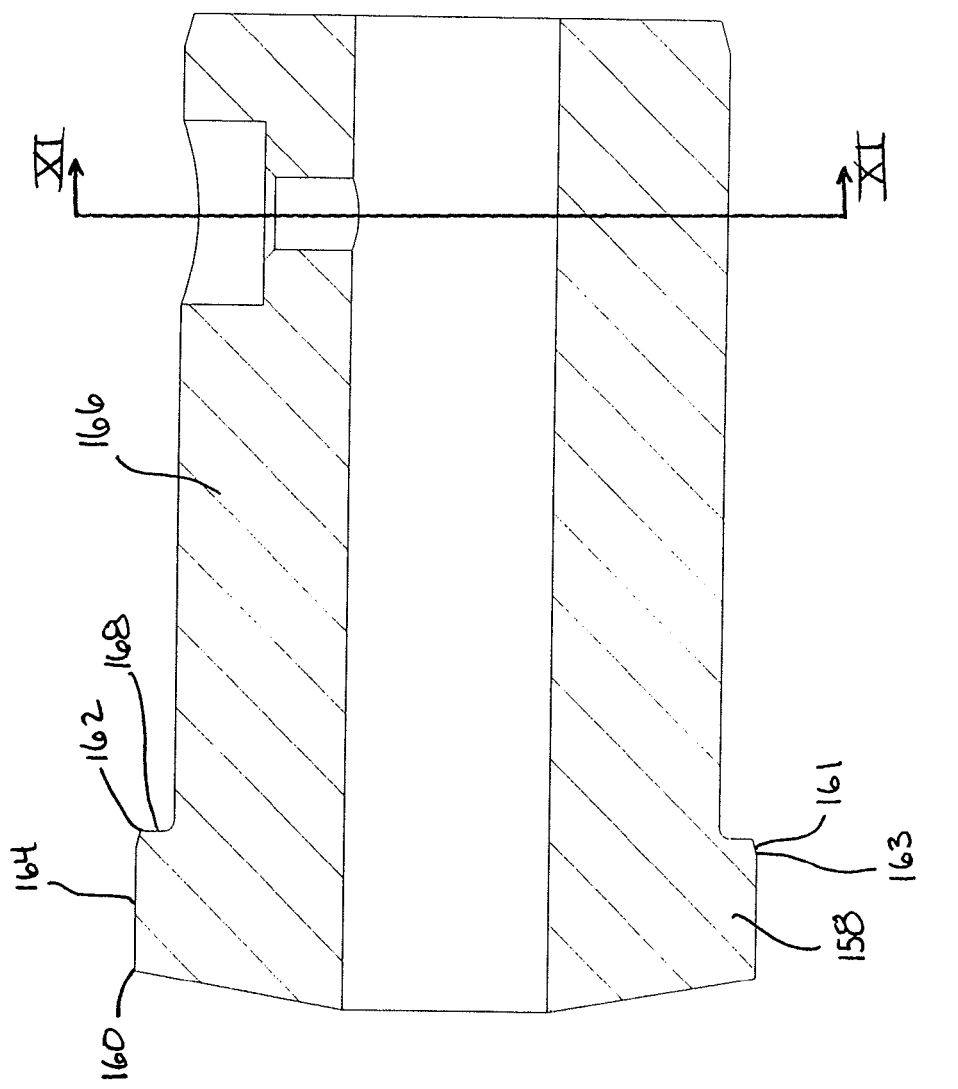
Figure 11:
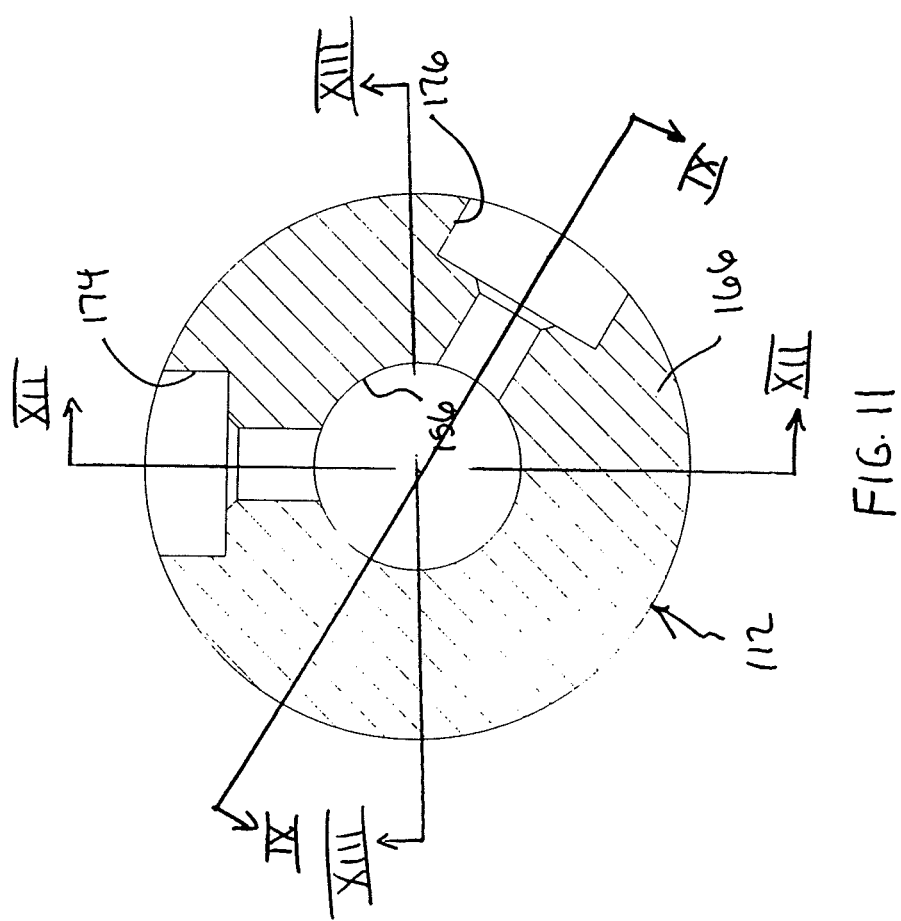

FIG. 9 provides a cross-sectional view of the mixing chamber of the present invention taken along cross-section line IX-IX in FIG. 11.

Figure 10:
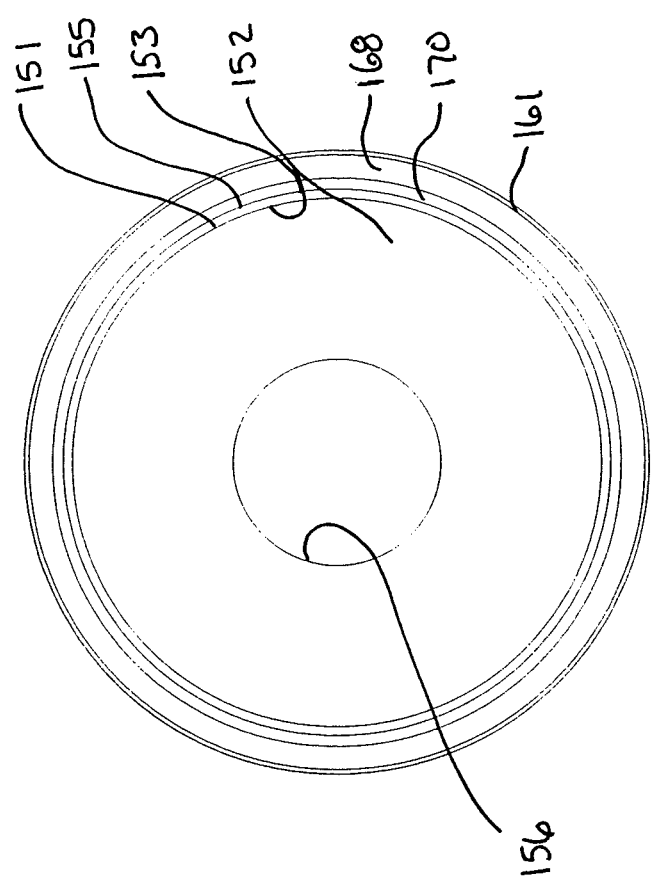

FIG. 10 shows a rear end elevational view of the mixing chamber in FIG. 9.

FIG. 11 shows a cross-sectional view of the mixing chamber taken along cross-section line XI-XI in FIG. 9.

Figure 12:
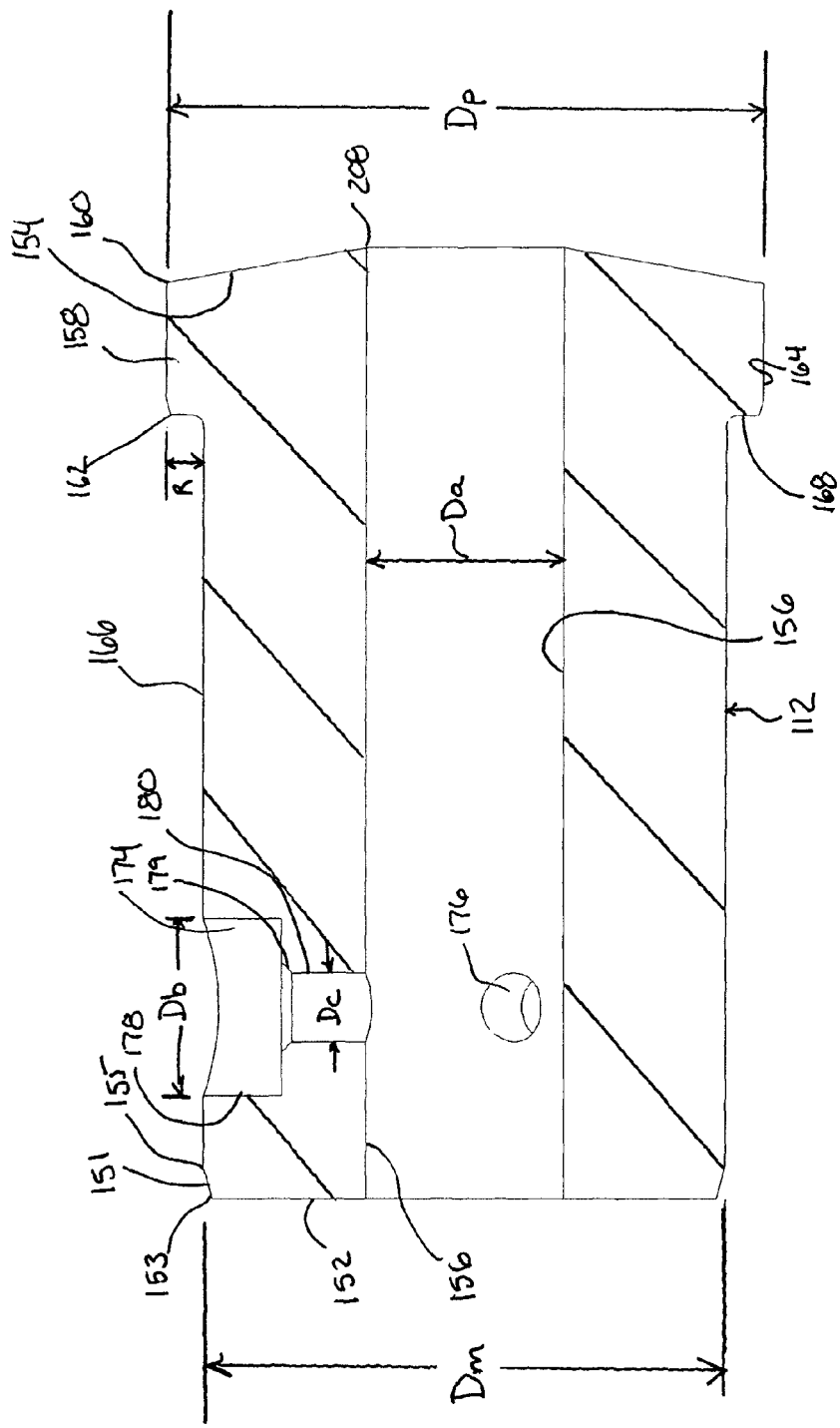

FIG. 12 shows a cross-sectional view of the mixing chamber taken along cross-section line XII-XII in FIG. 11.

Figure 13:
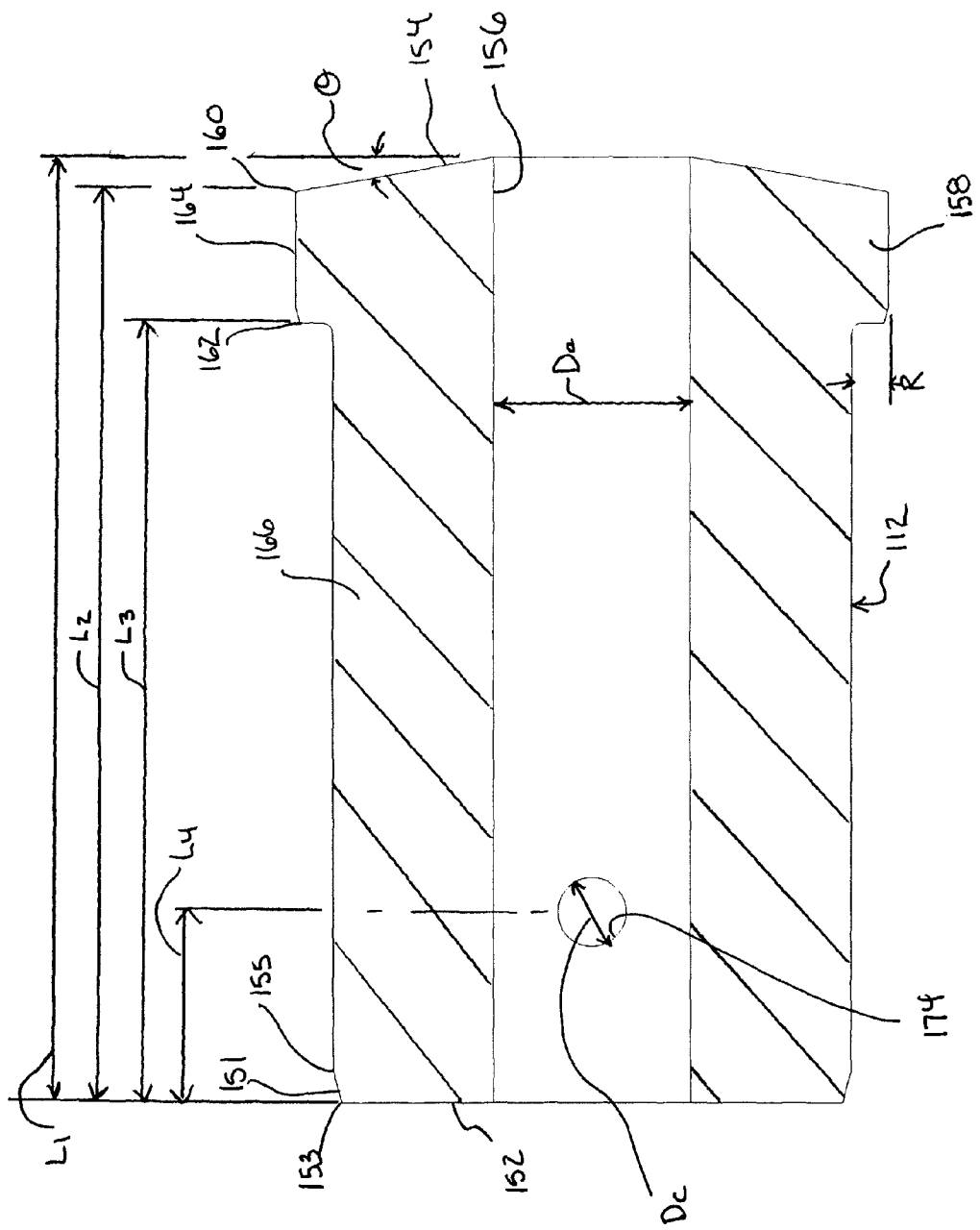

FIG. 13 shows a cross-sectional view of the mixing chamber taken along cross-section line XIII-XIII in FIG. 11.

Figure 14:
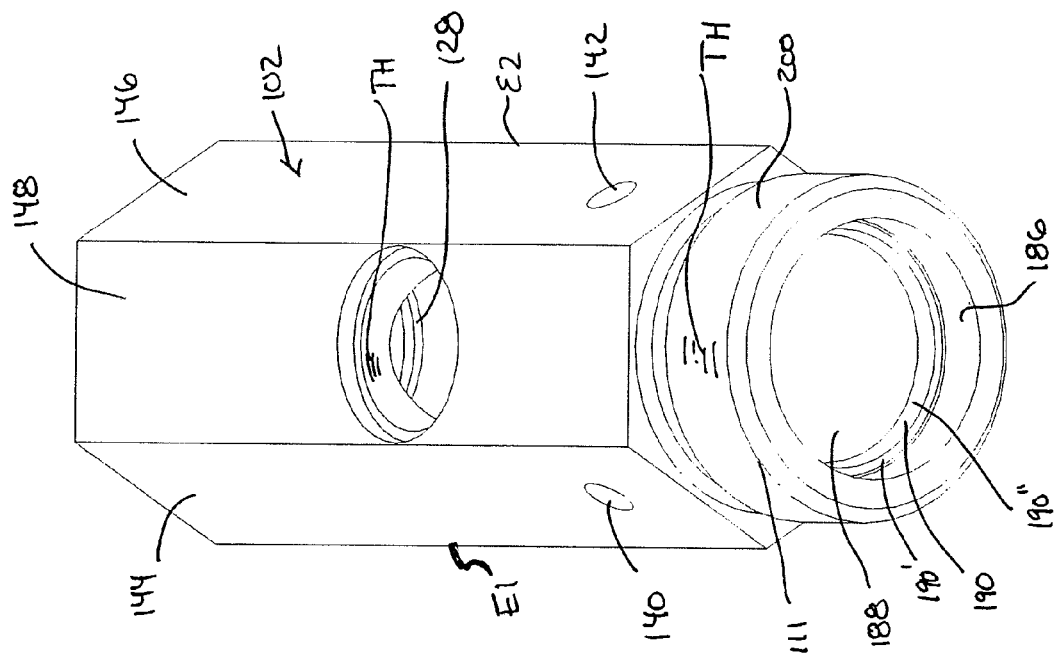

FIG. 14 shows a top-front end perspective view of the mixing chamber housing of the present invention.

Figure 15:
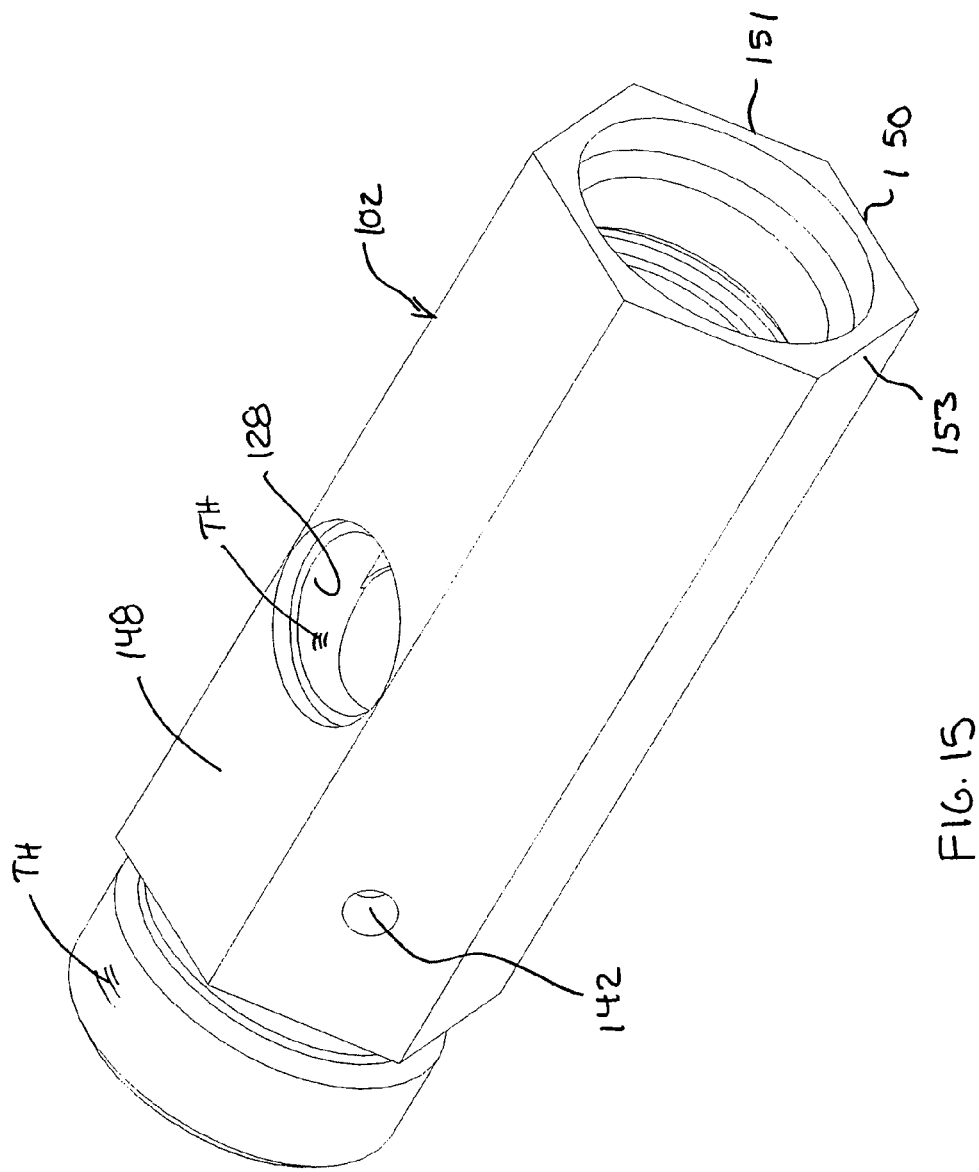

FIG. 15 shows a top-rear end and side perspective view of the mixing module housing of the present invention.

Figure 16:
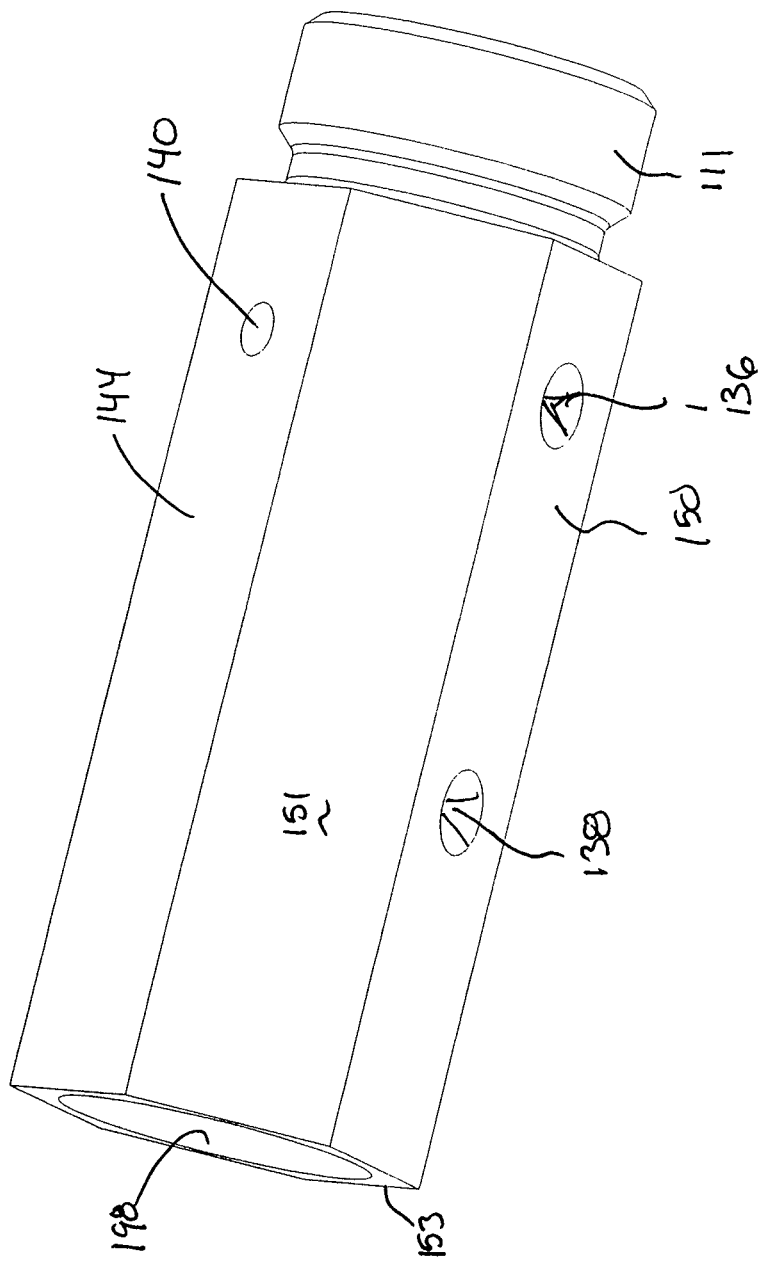

FIG. 16 shows a bottom-side perspective view of the mixing module housing of the present invention.

Figure 17:
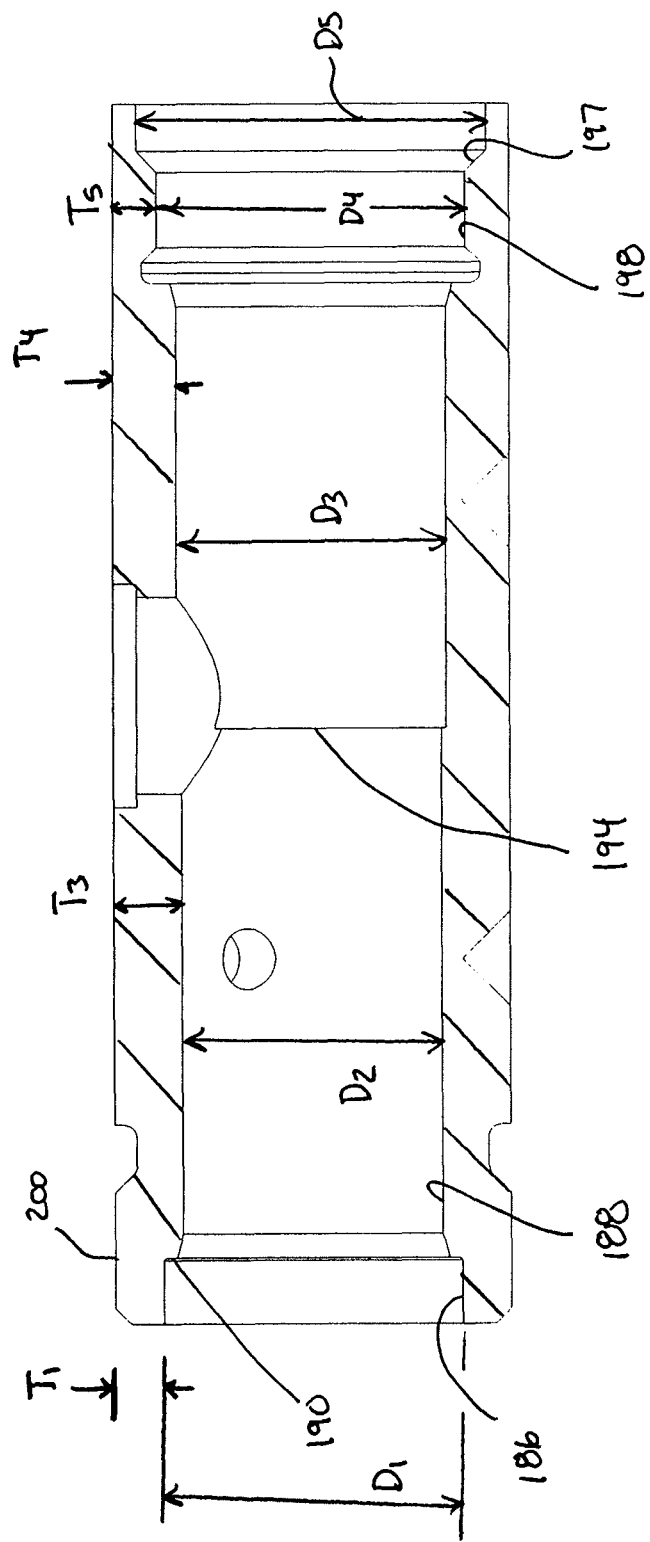

FIG. 17 shows a cross-sectional view of the mixing module housing of the present invention taken along a vertical axis bisecting the illustration in FIG. 14.

Figure 18:
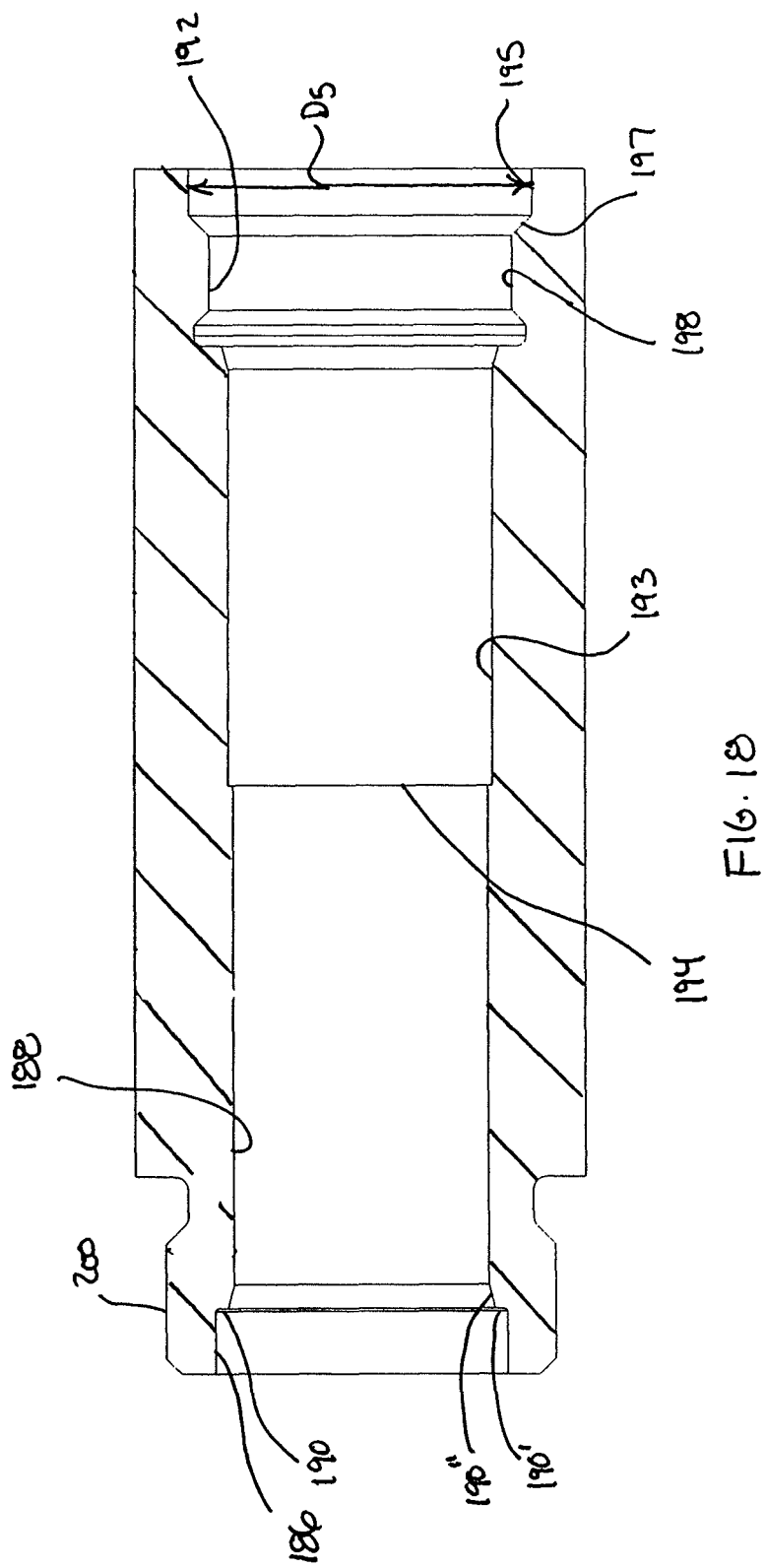

FIG. 18 shows a cross-sectional view of the mixing module housing of the present invention taken along a horizontal plane extending between edges E1 and E2 of the housing and looking down.

Figure 19:
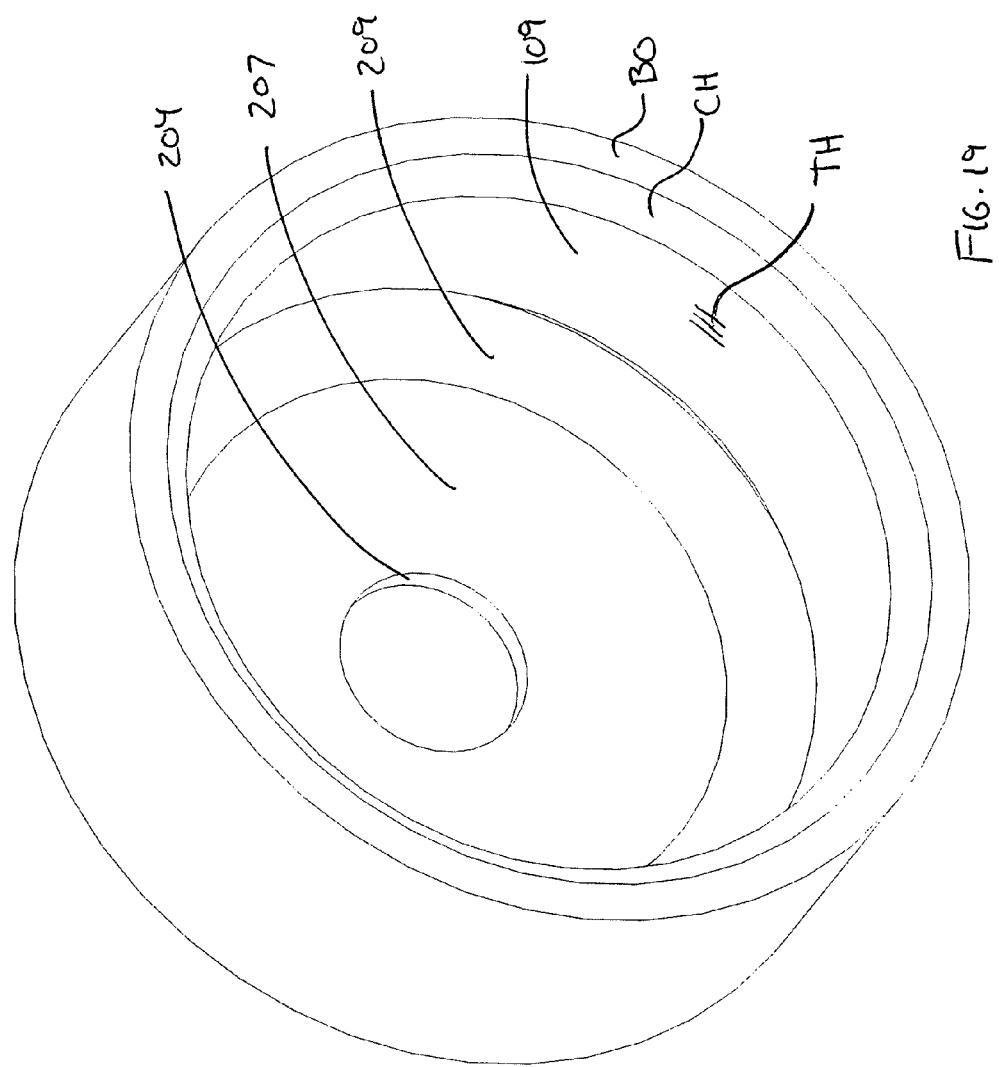

FIG. 19 shows an interior or back side perspective view of the front cap of the mixing module.

Figure 20:
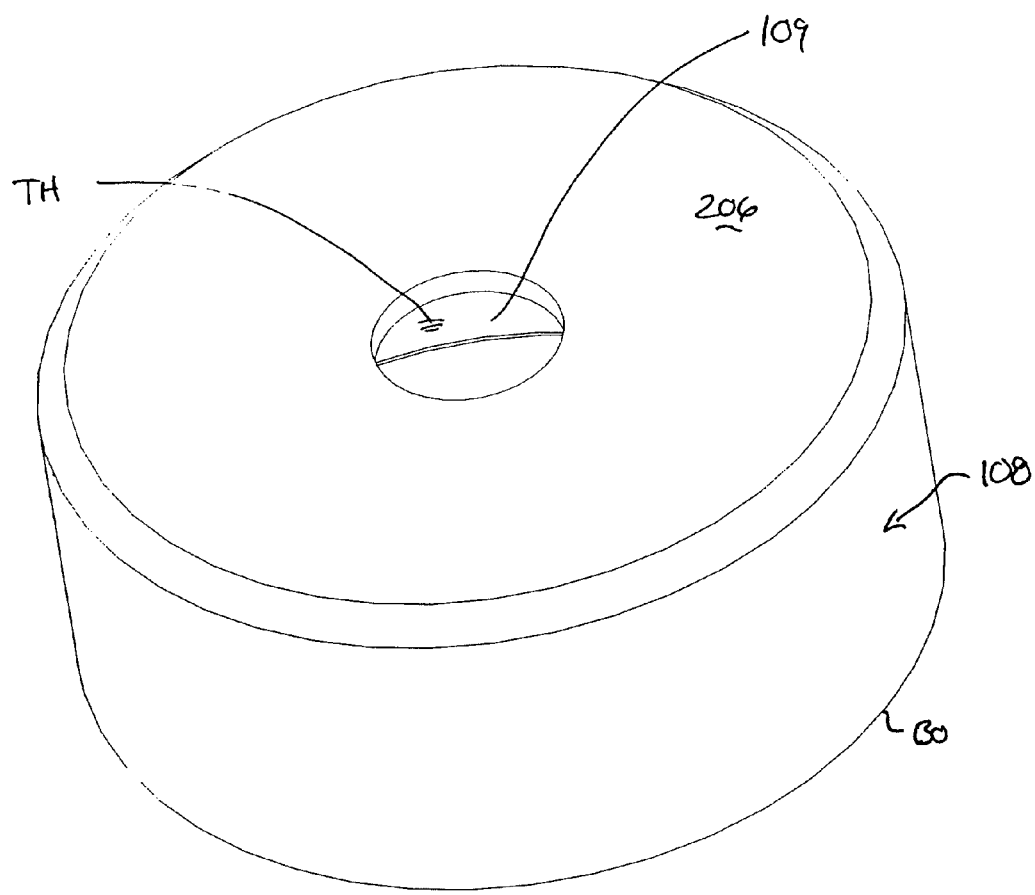

FIG. 20 shows an exterior or front side perspective view of the front cap of the mixing module.

Figure 21:
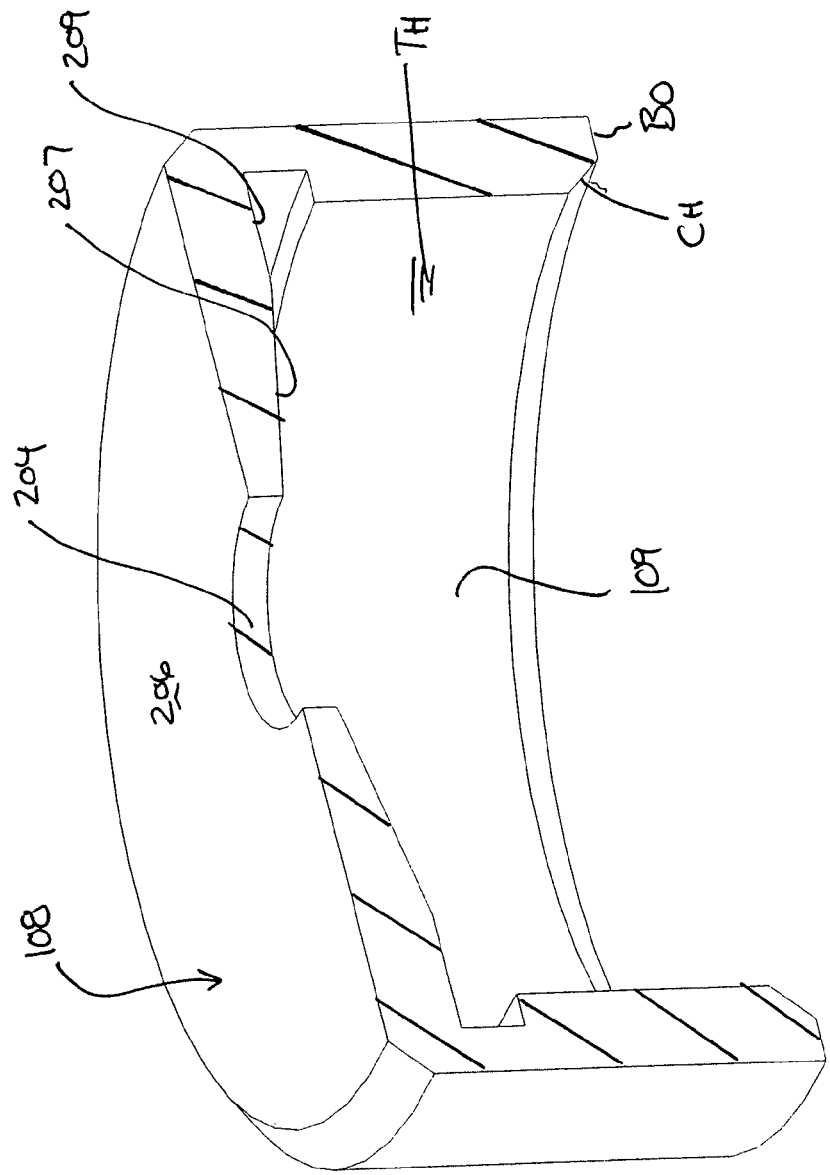

FIG. 21 shows a vertical bisecting cross-sectional view of the front cap in FIG. 20.

Figure 22:
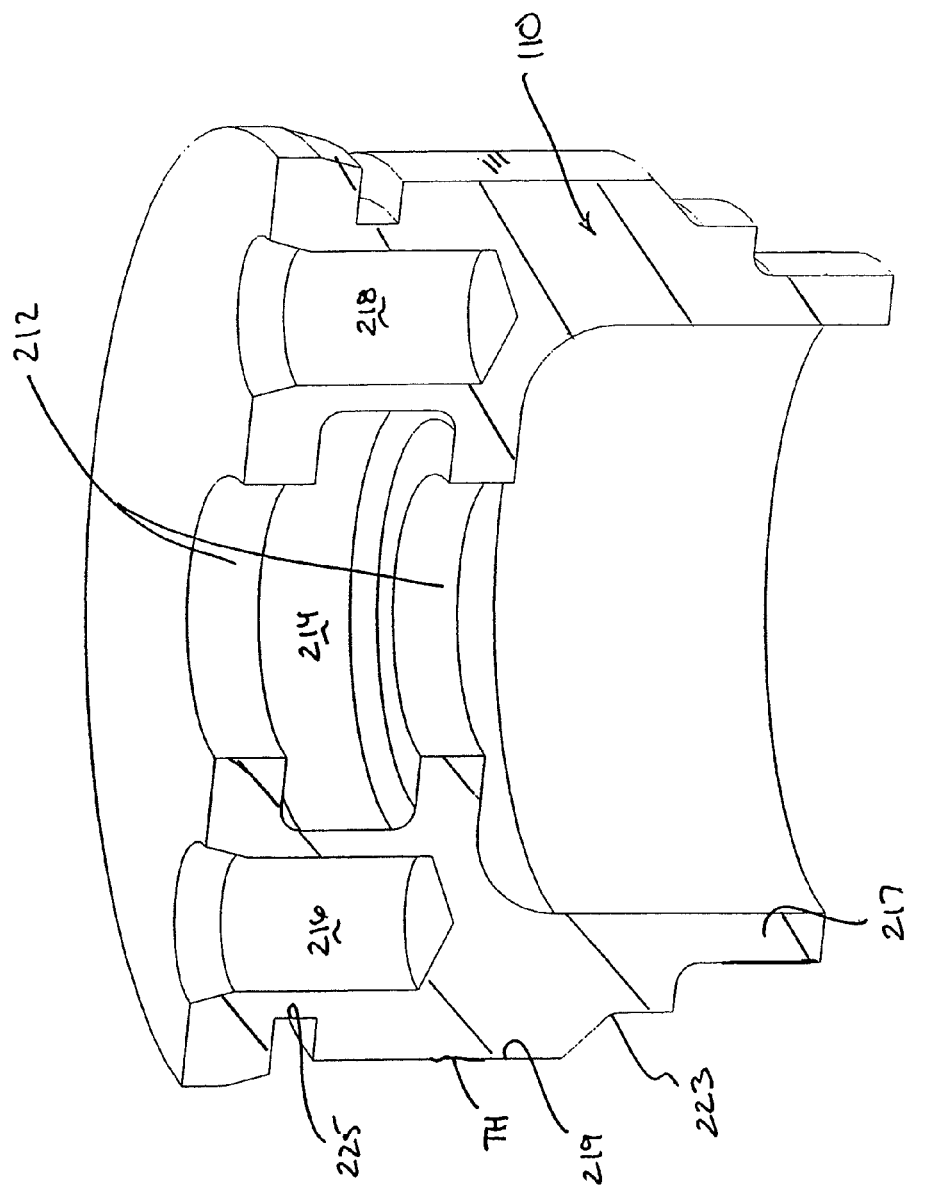
Figure 24:
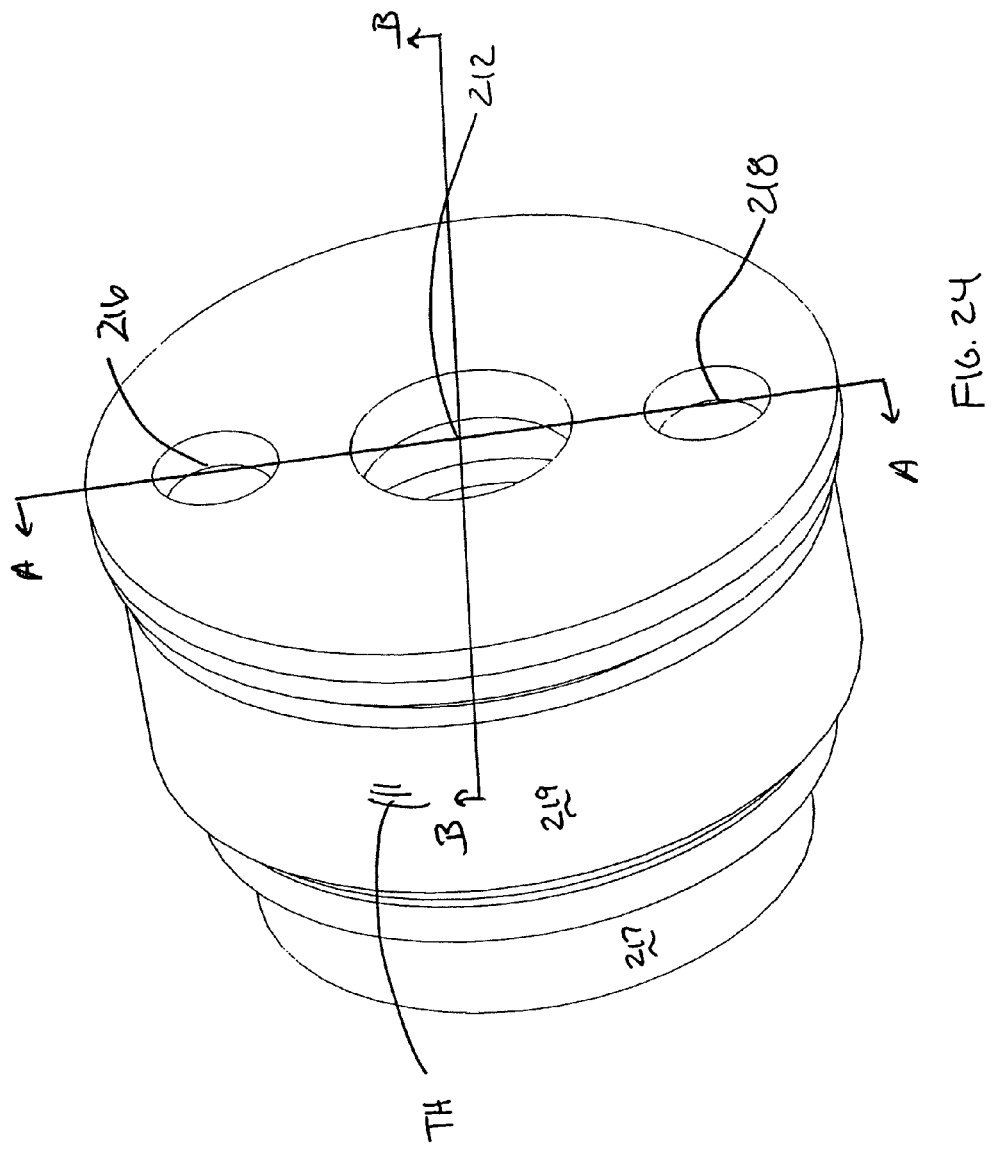

FIG. 22 shows a cross-sectional view of the mixing module back cap taken along cross-section line A-A in FIG. 24.

Figure 23:
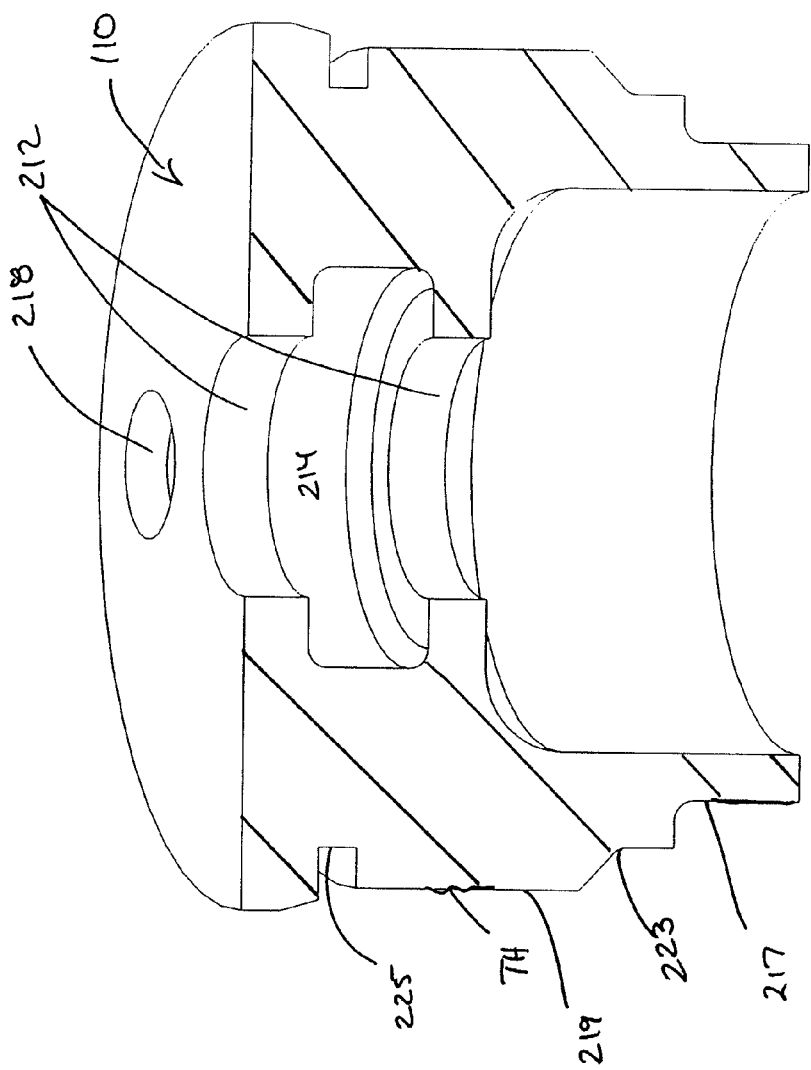

FIG. 23 shows a cross-sectional view of the mixing module back cap taken along cross-section line E-E in FIG. 24.

FIG. 24 shows a perspective view of the mixing module back cap.

Figure 25:
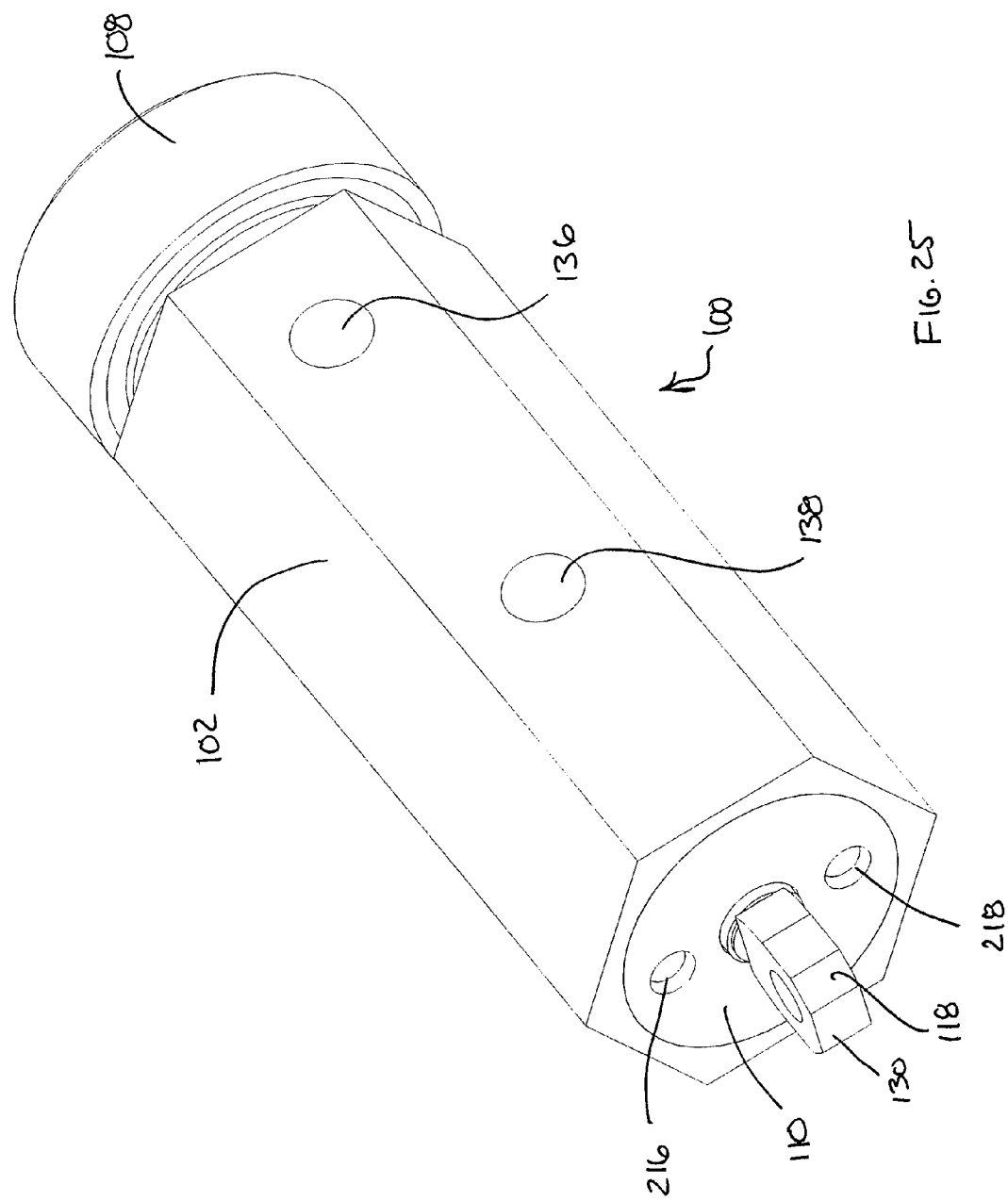

FIG. 25 shows a rear and side perspective view of the mixing module of the present invention.

Figure 26:
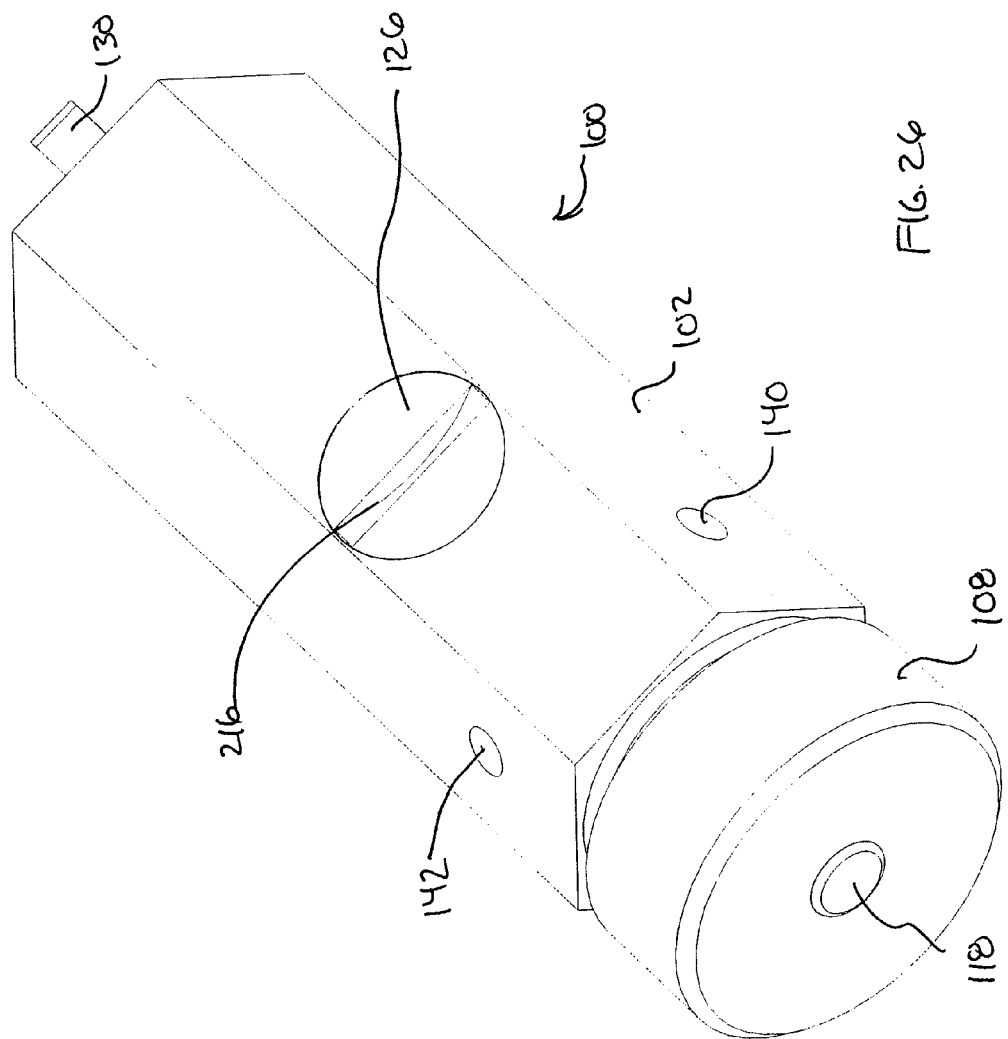

FIG. 26 shows a front and top perspective view of the mixing module of the present invention.

Figure 27:
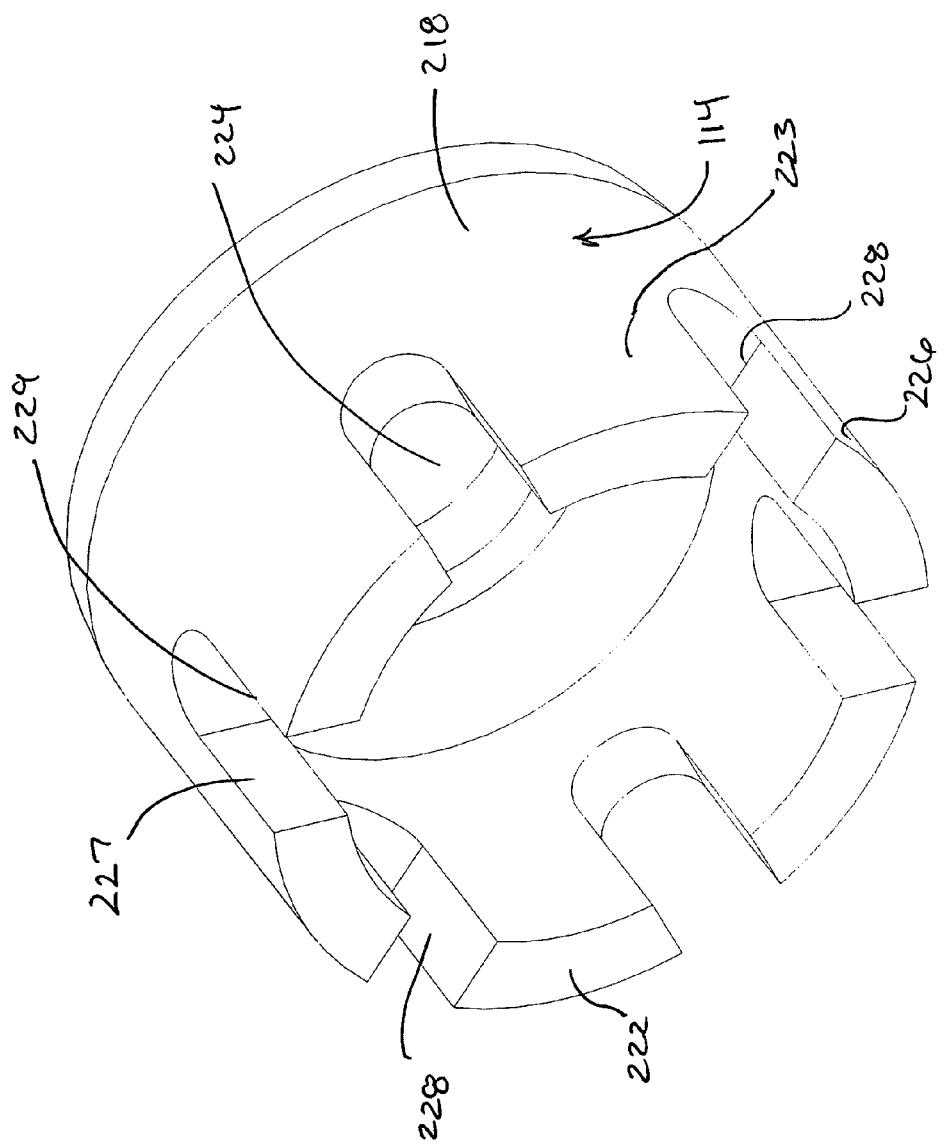

FIG. 27 shows a front and side perspective view of the mixing module spacer of the present invention.

Figure 28:
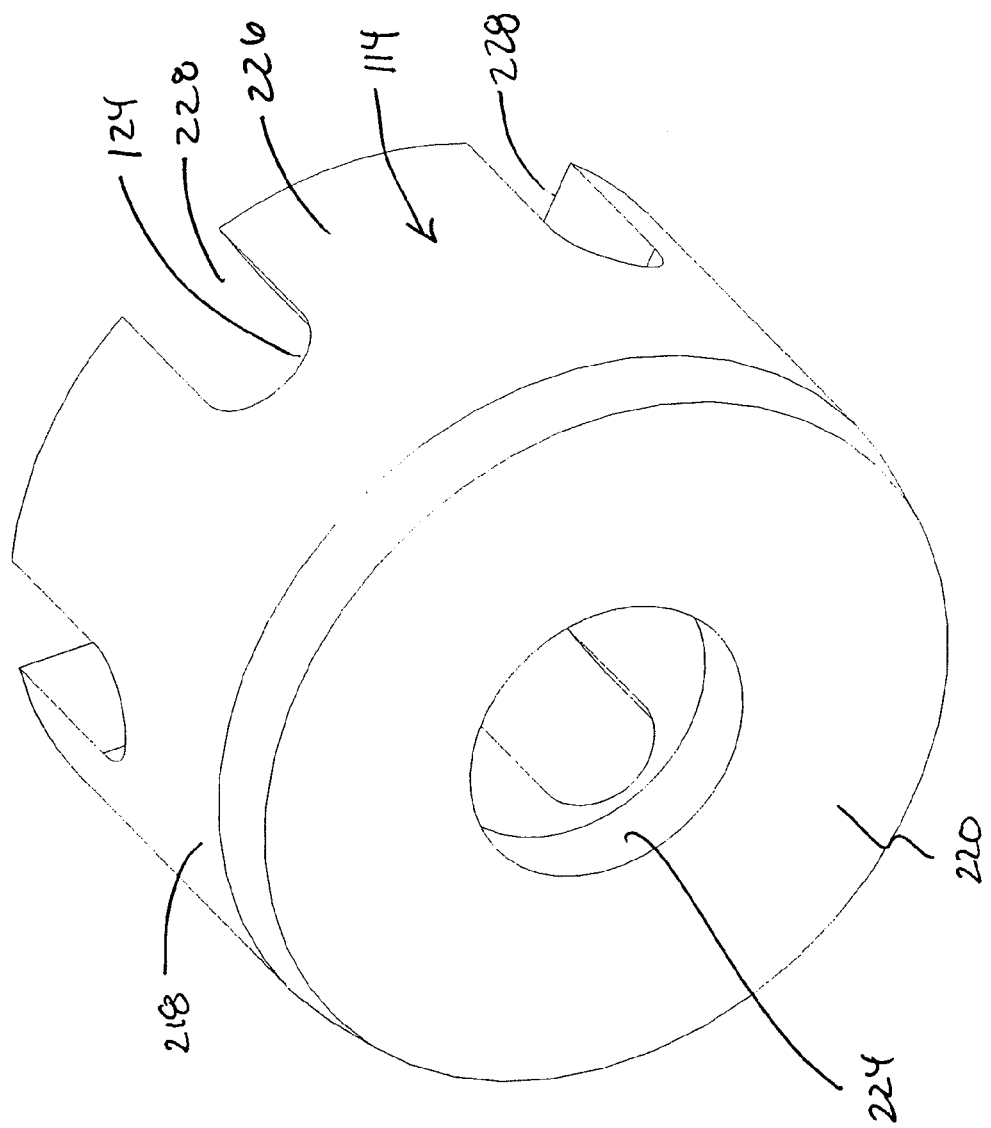

FIG. 28 shows a rear and side perspective view of that spacer.

FIG. 29A-29G show in rotating side to top illustration sequence the chemical port of the present invention from a first origination viewpoint.

FIG. 30A-30G show a similar rotating illustration sequence of the chemical port from a second origination viewpoint.

FIG. 31A-31F show a rotating side to bottom illustration sequence of the chemical port.

Figure 32A:
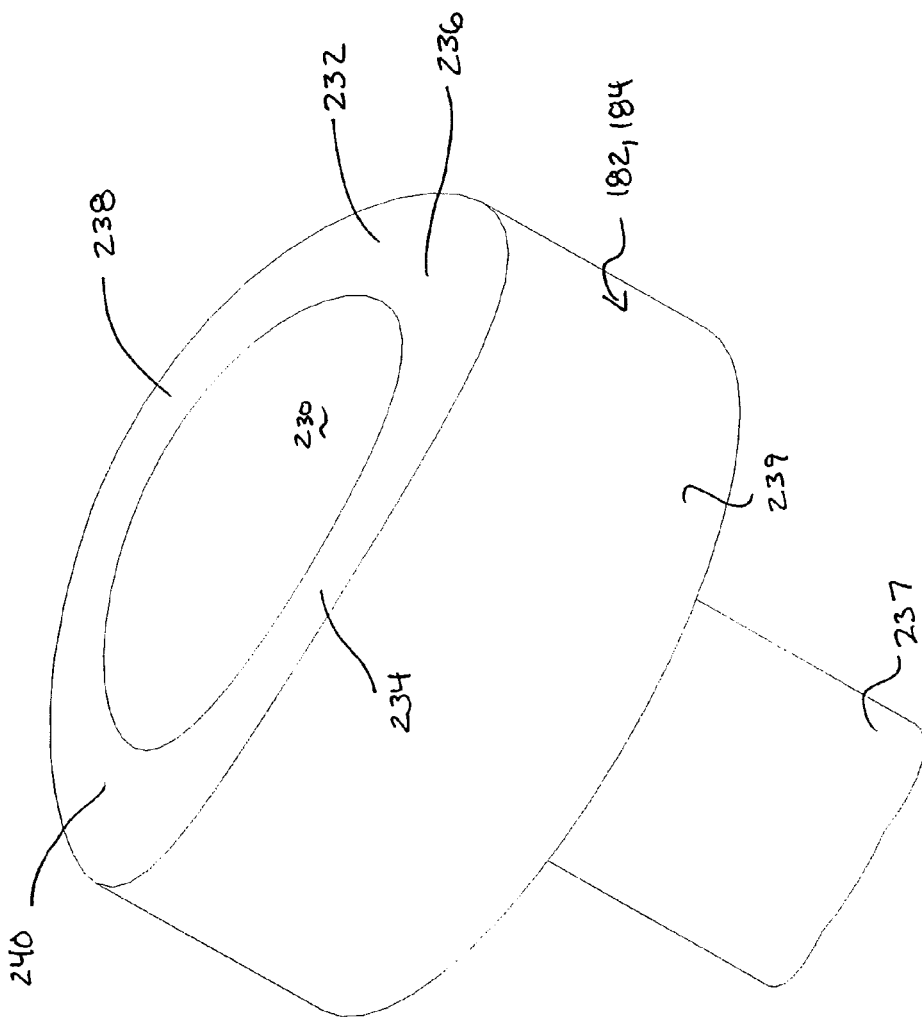
Figure 32C:
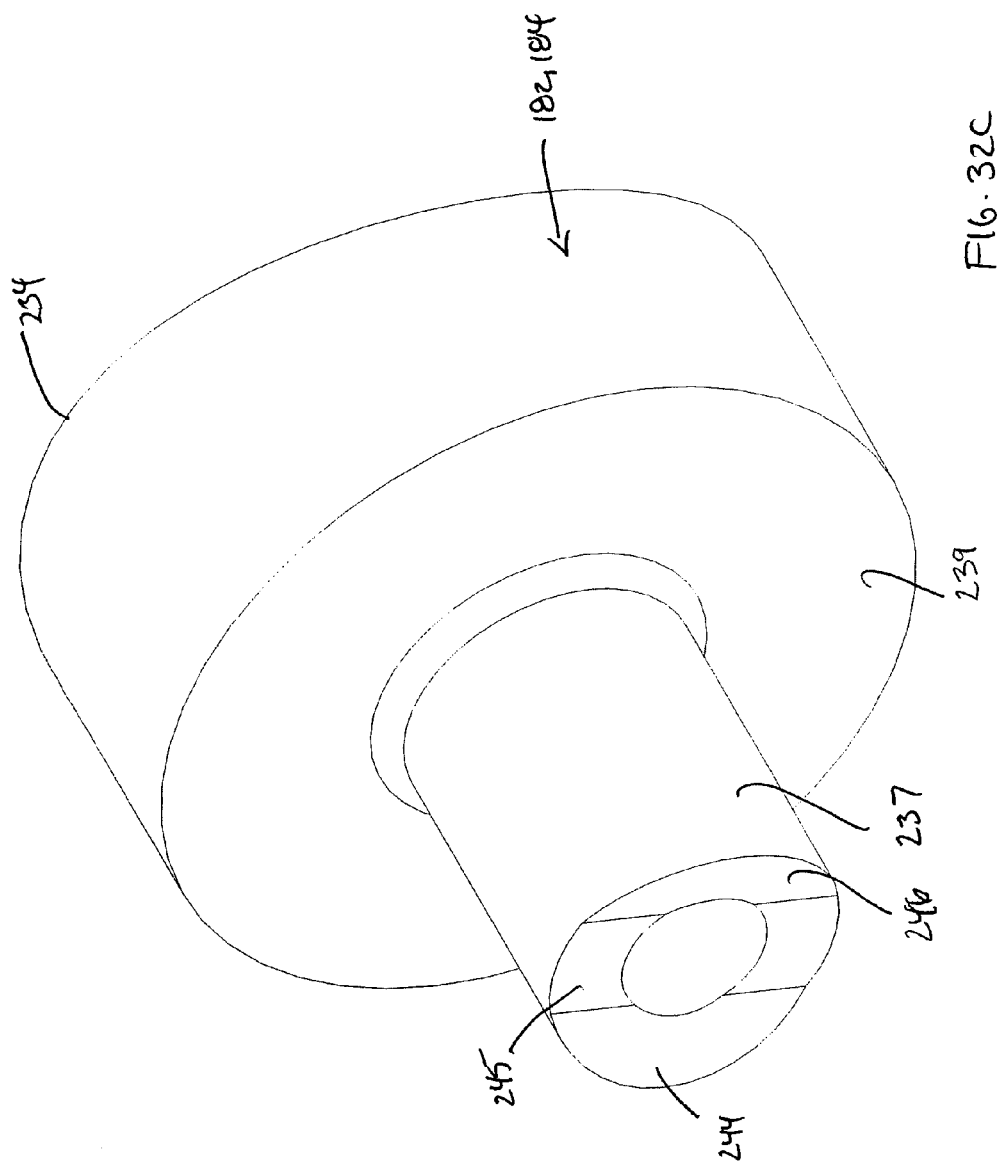

FIG. 32A-32C show additional perspective views of the chemical port.

Figure 29A:
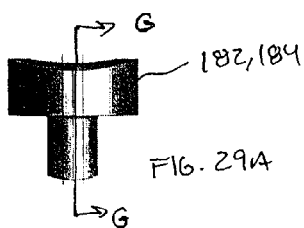
Figure 33:
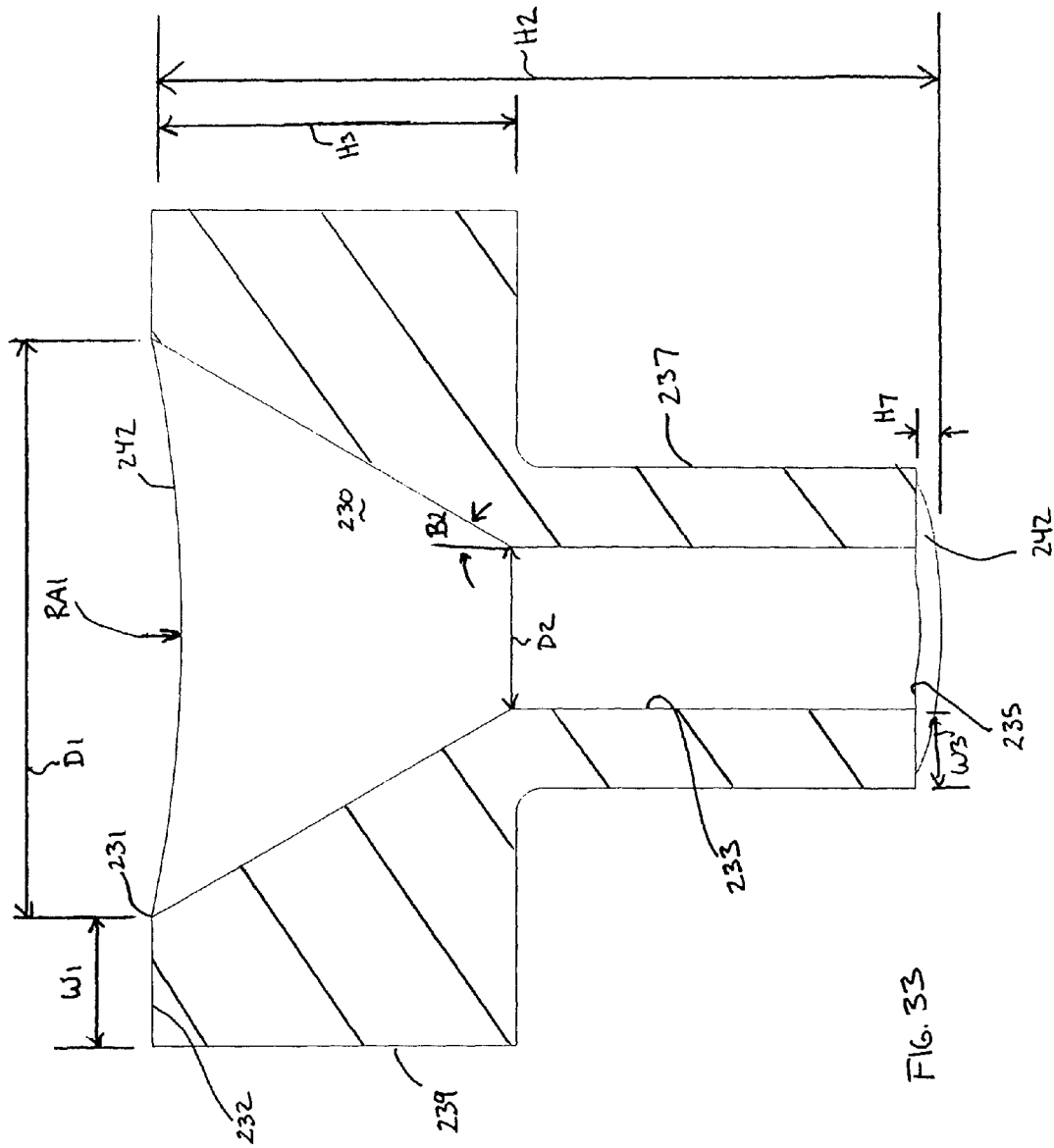

FIG. 33 shows a cross-sectional view of the chemical port taken along cross section line F-F in FIG. 29A.

Figure 30A:
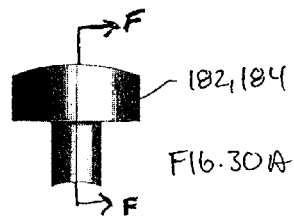

FIG. 34 shows a cross-sectional view of the chemical port taken along cross-section line G-G in FIG. 30A.

DETAILED DESCRIPTION OF PREFERRED EMBODIMENTS

FIGS. 4-7 illustrate mixing module 100 of the present invention which comprises housing 102 having a "front" (open) end 104 and a "rear" (open) end 106 with associated front end face cap 108 and back cap 110. Caps 108, 110 retain in operating position mixing chamber 112, slotted cup-shaped spacer 114 and Belleville washer stack 116 (the preferred form of compression means). Each of the face cap 108, mixing chamber 112, spacer 114, washer stack 116 and back cap 110 have an axial passageway for receiving valving and/or purge rod ("rod" hereafter) 118. Mixing module 100 also preferably has solvent chamber 122 with spacer 114 and back cap 110 preferably formed with solvent reception pockets or cavities (123,124). The Belleville washers in stack 116 are also shown as having an annular clearance space (see FIGS. 5 and 7) which facilitates solvent flow or presence along the received portion of rod 118.

As explained in greater detail below, solvent cap 126 is threadably secured (or otherwise readably releasably secured with associated tooling or hand gripping means as in a finger grip projection (not shown) or the more preferred tool insertion recess 216). Its seal off portion is fixable to housing 102 to close off solvent access opening 128 formed in one of the sides of the multisided housing 102 (e.g., see the FIG. 4 hexagonal wall arrangement). Solvent cap 126 is preferably positioned to axially overlap part of the Belleville washer stack 116 and the spacer 114 positioned between the compression means 116 and Teflon block mixing chamber 112. The Belleville washer stack 116 is also preferably arranged in opposing pairs (e.g., 8 washer pairs with each pair set having oppositely facing washers) which provides a preferred force level of for example, 150 to 250 lbf (with 200 lbf. being preferred for many uses of the invention) relative to spacer contact with the mixing chamber and corresponding mixing chamber contact with the interior face of front cap 108.

It should be noted that any dimension or range disclosure (including those above and below) presented in the present application is not intended to be limiting, but is provided for illustrative purposes to better appreciate a variety of aspects of the present invention.

Figure 5:
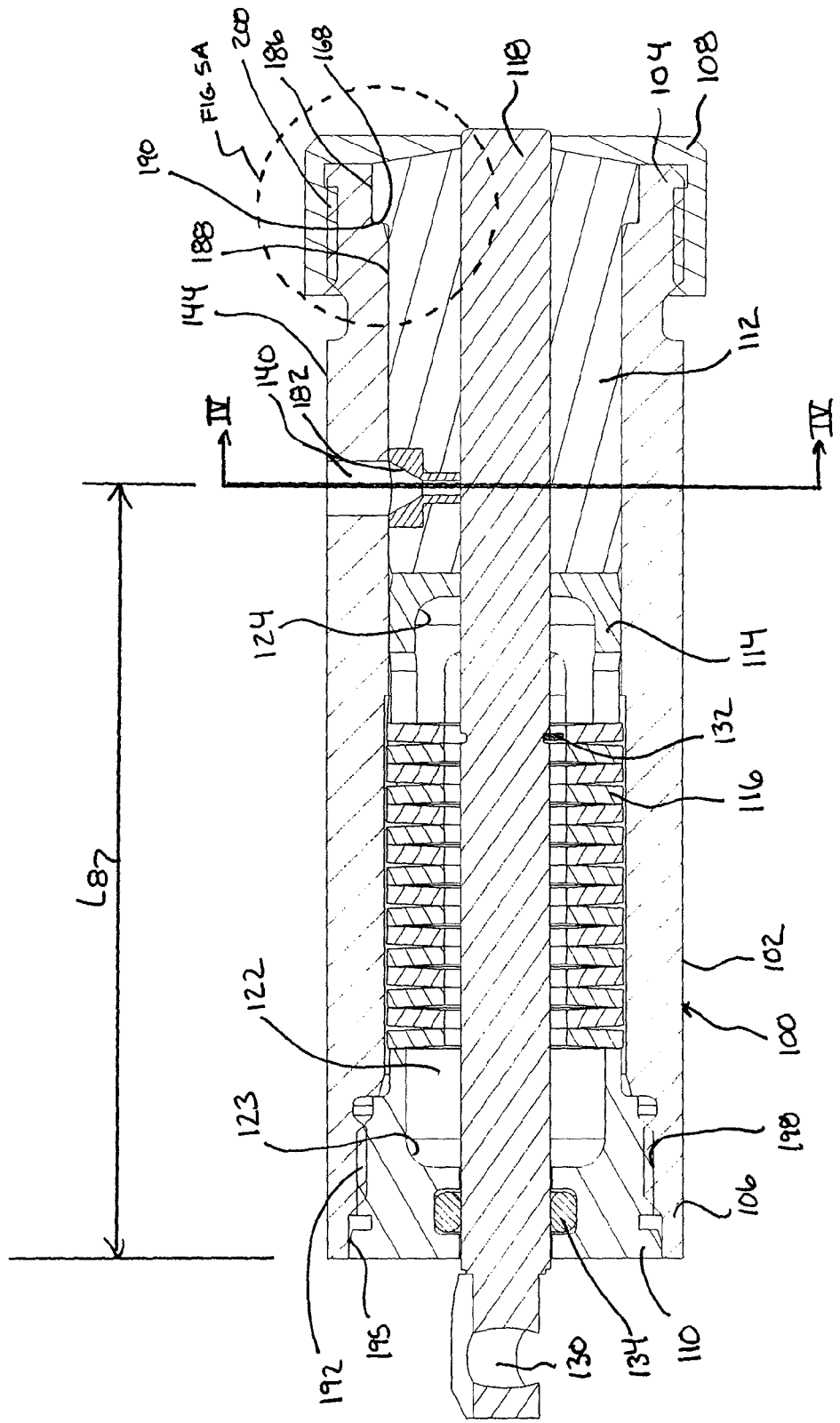
FIG. 5 shows a cross-sectional view of the mixing module of FIG. 4 taken along cross-section line V-V in FIG. 4.

As further shown in FIGS. 5 and 7, valving rod 118 has an apertured reciprocating means capture end 130 (for example, a motorized rod reciprocator attachment end) and axially extends completely through the housing and is shown to extend out past respective face and back caps 108 and 110. Rod 118 also comprises annular limit ring 132 to avoid an unintended complete pulling out of rod 118 from the mixing module. A rod contacting seal member 134 is further preferably provided such as an inserted O-ring into an O-ring reception cavity formed in back cap 110. Housing 102 is also shown in FIGS. 7 and 16 as including position cavities 136, 138 for securing the housing in position relative to a hand held holder or a non-hand held dispenser system (e.g., bagger system with fixed in position mixing module). It should be noted, that while a preferred embodiment features the mixing module associated with a hand held dispenser the mixing module is not limited to hand held dispenser or foam-in-by systems, but is useable in any environment where a mixing module is operated. As an example, reference is made to the foam-in bag dispenser assembly and associated systems described in provisional applications A-O listed in the Table below, and with each of the provisional applications listed being incorporated herein by reference.

| REFERENCE | U.S. SER. NO. | FILED | TITLE |
|---|---|---|---|
| A | 60/468,942 | MAY 9, 2003 | DISPENSER ASSEMBLY WITH MIXING MODULE DESIGN |
| B | 60/469,034 | MAY 9, 2003 | BAGGER WITH INTEGRATED, INLINE CHEMICAL PUMPS |
| C | 60/469,035 | MAY 9, 2003 | MIXING MODULE DRIVE MECHANISM |
| D | 60/469,037 | MAY 9, 2003 | MIXING MODULE MOUNTING METHOD |
| E | 60/469,038 | MAY 9, 2003 | DISPENSER TIP MANAGEMENT SYSTEM |
| F | 60/469,039 | MAY 9, 2003 | HINGED FRONT ACCESS PANEL FOR BAG MODULE OF, FOR EXAMPLE, A FOAM IN BAG DISPENSER |
| G | 60/469,040 | MAY 9, 2003 | IMPROVED FILM UNWIND SYSTEM WITH HINGED SPINDLE AND ELECTRONIC CONTROL OF WEB TENSION |
| H | 60/469,042 | MAY 9, 2003 | EXTERIOR CONFIGURATION OF A FOAM-IN-BAG DISPENSER ASSEMBLY |
| I | 60/468,988 | MAY 9, 2003 | BAG FORMING SYSTEM EDGE SEAL |
| J | 60/468,989 | MAY 9, 2003 | IMPROVED HEATER WIRE |
| K | 60/468,982 | MAY 9, 2003 | FOAM-IN-BAG DISPENSER SYSTEM WITH INTERNET CONNECTION |
| L | 60/468,983 | MAY 9, 2003 | ERGONOMICALLY IMPROVED PUSH BUTTONS |
| M | 60/488,010 | JUL. 18, 2003 | CONTROL SYSTEM FOR A FOAM-IN-BAG DISPENSER |
| N | 60/488,102 | JUL. 18, 2003 | A SYSTEM AND METHOD FOR PROVIDING REMOTE MONITORING OF A MANUFACTURING DEVICE |

| REFERENCE | U.S. SER. NO. | FILED | TITLE |
|---|---|---|---|
| O | 60/488,009 | JUL. 18, 2003 | PUSH BUTTONS AND CONTROL PANELS USING SAME |

Housing 102 still further includes chemical passage inlet holes 140, 142 formed for example, at midway points peripherally across side walls 144 and 146 (FIG. 4) and within the forward axial half of housing 102 (e.g., a location at about ⅓ back from the front end). Walls 144, 146 are positioned to opposite sides of intermediate side wall 148 in the preferred hexagonal configured housing 102. Wall 148 is preferably diametrically opposed to wall 150 in which position cavities 136, 138 are formed. Chemical inlets 140, 142 and they are shown positioned in the preferred 120° chemical inlet spacing in walls 144, 146.

Reference is made to FIGS. 5A, 8A, 8B, 8C and 9-13, for a further discussion of mixing chamber 112 with locking or rod stick movement prevention means 158. FIGS. 8A and 8B provide perspective views of a preferred embodiment for mixing chamber 112 which is preferably formed of a low friction material such as one having cold flow capability with TEFLON brand material a preferred material.

Mixing chamber 112 has first end (e.g., spacer sleeve contact end) 152 and second (e.g., front) end 154 which is placed in abutment with the similarly configured interior surface of the front cap once installed in housing 102. As shown in FIGS. 12 and 13, axial rod passageway (or through hole) 156 extends along through the central axis of mixing chamber 112 so as to open out at the first and second ends.

FIGS. 12 and 13 illustrate the preferred configuration for passageway 156 as being a continuous diameter passageway of diameter Da (a range of 0.1 to 0.5 inch is illustrative of a suitable diameter range Da with 0.15 to 0.3 inch being a more preferred sub-range and 0.187 inch being a preferred value for Da). FIGS. 8A and 8B further illustrate locking or rod stick movement prevention means 158 in the form of locking protrusion 158, which in a preferred embodiment is an annular protrusion having a forward edge 160 (FIG. 8A) coinciding with the outer radial edge of front face 154, and rear edge 162 defining an axial inner edge of peripheral surface 164. Sloped surface 161 extending between read edge 163 and adjacent edge 163 provides a chamfered rear edge portion in locking protrusion 158 which facilitates proper positioning within the housing during assembly. Locking protrusion 158 is preferably integral with main body portion 166 (e.g., entire mixing chamber formed as a monolithic body and also preferably of a common material as in Teflon). As illustrated, the radial interior edge of step down wall ring 168 extends from the front region of the main body portion 166. Rear end 152 of main body portion 166 also preferably features a chamfered peripheral edge 151 defined between the rearward most edge 153 and an adjacent edge 155 to facilitate initial insertion of the mixing chamber 112 into housing 102. The slope of chamfered edge 161 preferably is the same as that as for chamfered edge 151.

Locking means 158 can take on a variety of configurations under the present invention (e.g., either peripherally continuous or interrupted with common or different lengths/heights protrusion(s) about the periphery of the mixing chamber) as well as a variety of axial extension lengths and a variety of radial extension lengths (e.g., a radial distance R (FIG. 13) between surface 164 and the forwardmost outer, exposed surface of main body 166 of 0.025 to 0.1 inches with 0.035 to 0.05 inches being a suitable sub-value range). Length R includes a combination of wall 168 and chamfered edge 161 with the latter representing a small percentage of the radial distance R (e.g., sloped surface 161 represents 25 to 50% of overall radial distance R). The utilized axial length and radial extension of locking protrusion 158 is designed to provide a sufficient locking in position function (despite rod stick due to the static friction/adhesion relationship between the rod and mixing chamber that can be expected during normal operation) with an efficient use of material.

FIGS. 8C and 8D provide a partial front view of the locking relationship and a cut-away perspective view of the male protrusion component of the male/female multi-protrusion/recesses arrangement of an alternate embodiment of the locking means 158' present invention. As seen therein, there is a non-continuous circumferentially serial mixing chamber protrusion/recess set 159 for the locking means 158' which is different than the male/female locking relationship of the first describe continuous protrusion embodiment (dashed reference numbers corresponding generally with those in the first embodiment). FIGS. 8C and 8D further illustrate the housing intermeshing protrusion/recesses (167, 167') set (female recesses 169 receiving male protrusions 191 in the illustrated embodiment) extending axially forward from a continuous backing wall 168' in mixing module 112' and wall surface 190' in housing 102'. The combination providing an axial stop in association with the circumferential intermeshing as well as a rotation lock (although the axial lock which precludes "axial rod stick" movement is considered all that is required in practice).

Figure 5A:
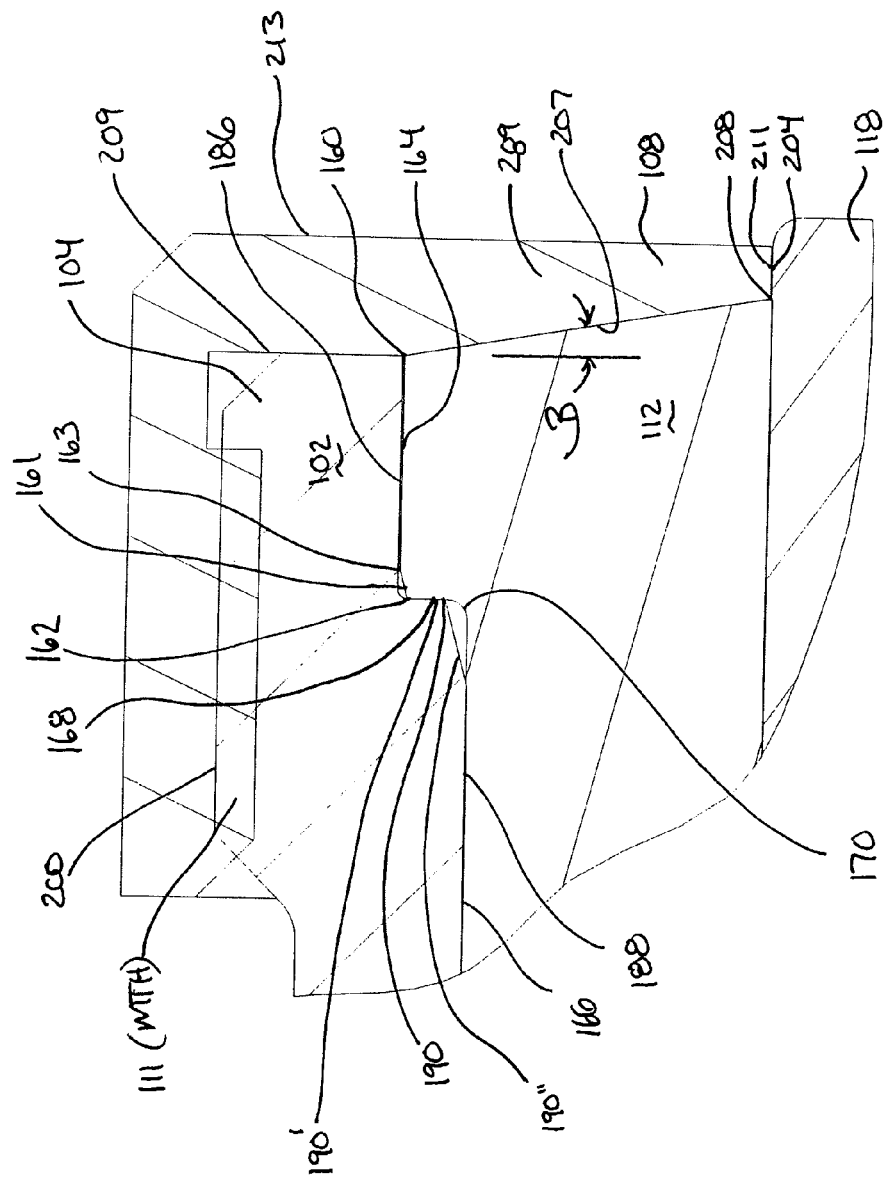
FIG. 5A is an enlarged view of the referenced front area of the mixing module shown in FIG. 5.

FIGS. 5A, 8B and 12 illustrate the preferred continuous annular protrusion locking means 158 featuring stepwall 168 extending off from main body 166 (preferably with a curved filler or minor transition slope wall 170) with the overall locking protrusion diameter Dp being preferably of 0.25 to 1.0 inch with a preferred value of 0.56 of an inch. Diameter Dm of the rear end of main body 166 (FIG. 12) or average width if there is other than a cylindrical cross-section for main body 166 is preferably 0.35 to 0.75 inch or more preferably a value of 0.49 of an inch with the difference (Dp−Dm=R) representing about 5 to 15% of Dp. Also, a preferred diameter Da for rod passageway 156 is 0.1 to 0.4 inch or 0.15 to 0.3 inch as a preferred intermediate range with 0.19 inch being a preferred value. The main body portion's radial annular wall thickness forming its annular ring (with its inner surface defing in the chemical mixing area) is preferably 0.1 to 0.5 inch with 0.15 inch being preferred.

Also, while a two component system is a preferred embodiment of the present invention, the present invention is also suitable for use with single or more than two chemical component systems where there is a potential stick and compression means move problem in a mixing or dispensing chamber of a dispenser and a rod received therein.

Chemical port holes 174, 176 are shown in FIG. 8A, 8B and are formed through the radial thickness of main body portion 166 and are shown circumferentially spaced apart and lying on a common cross-section plane (a preferred arrangement as opposed to being axially offset). The central axis of each port hole 174, 176 is designed to be in common with a respective central axis of inlet passage holes 140, 142 in housing 102 (FIGS. 4, 5) and with each intersecting the central axis of passageway 156.

Also, port holes 174, 176 each preferably have a step configuration with an outer large reception cavity 178 and a smaller interior cavity 180, and, therebetween, is formed annular step wall 181 with sloped or chamfered transition wall 179. The step configuration is dimensioned to accommodate chemical ports 182, 184 (FIG. 4) which are preferably stainless steel ports designed to produce streams of chemicals that jet out from the ports to impinge at, for example, a 120° angle to avoid chemical cross-over problems in the mixing chamber cavity. As shown in FIGS. 4, 12 and 13, diameters Db and Dc are dimensioned in association with the dimensioning of ports 182, 184 with a preference to have the inlet end of ports 182 and 184 of a common diameter and aligned relative to the exit end of housing inlets 140, 142. Ports 182, 184 are shown to have an upstream conical infeed section and a cylindrical outfeed section each representing about 50% of the port's axial length. Dimension Db is preferably from 0.1 to 0.3 inch, with 0.17 inch being a representative preferred value and dimension Dc is preferably from 0.05 to 0.075 inch with 0.065 inch representing a preferred value.

FIG. 13 illustrates length dimension lines L1 to L4 for mixing chamber 112 with L1 representing the full axial length of mixing chamber 112 or the distance from the outer back edge to the forward most front edge (preferably 0.5 to 2 inches with 1 inch being a representative preferred value). L2 representing the axial distance from the back end 152 to the peripheral edge 160 of locking protrusion 158 (reduction from length L1 being due to the inward slope (e.g., 5 to 15° from vertical with 10° preferred) of the mixing chamber's front face and with length L2 preferably being 0.43 to 1.8 (or 0.02 to 0.07 inch smaller than length L1) with 0.95 (or 0.05 inch smaller than L1) being an illustrative preferred value. L3 represents the axial length between the rear edge 152 to locking protrusion interior edge 162 of surface 164 (preferably 0.5 to 1.0 inch with 0.74 inch being a preferred value). L4 represents the distance from the rear edge 152 to the central axis of the closest chemical passageway such as smaller interior cavity 180 (preferably 0.1 to 0.3 inch with 0.18 inch being a preferred value).

FIGS. 5 and 5A illustrate front end 104 of mixing module housing 102 having a larger diameter recess 186 which steps down to a lesser diameter housing recess 188. FIG. 5A shows step up wall 190 formed between the larger and smaller diameter housing recess 186, 188 which is dimensioned to correspond with step down wall ring 168 of locking protrusion 158 to provide an axial movement prevention means relative to reciprocating rod 118. The abutting relationship establishes an axial no movement locking relationship between mixing chamber 112 and housing 102 when the mixing module is in an assembled state (see below) and without such movement there can be avoided both axial and rotational shifting in the mixing chamber despite a temporary sticking of the rod in the mixing chamber and the potential for the compression means to compress were it not for the locking means 158. Thus, the mixing chamber is not subject to rod stick movement and avoids the previously mentioned problems associated with this movement, such as port misalignment.

The housing configuration is further illustrated in FIGS. 5, 5A, 7 and 14-18, with the latter providing perspective and cross-sectional views of housing 102 alone. FIGS. 15 and 18 illustrate a preferred step up wall 190 configuration formed between large diameter recess 186 and interior recess 188 which is radially transverse or oblique (e.g., conically converging in a forward to rearward direction although a flush, non-oblique vertical wall contact relationship is preferred). For example, with reference to FIG. 18, housing 102 has a radial thickness T1 defing recess diameter D1 at its forward most end (e.g., 0.10 to 0.20 in (e.g., 0.15 in) for T1, and 0.5 to 0.75 in for D1 with D1 preferably equal to 0.56, increases to thickness T2 of 0.2 to 0.3 in (0.25 in preferred) with a common exterior circumference such that a reduced diameter housing cavity 188 is formed which defines housing recess diameter D2 (0.4 to 0.6 in with 0.49 preferred) and is bridged by step wall 190. As best seen from FIG. 5A, step up wall 190 preferably comprises a more axial forward abutment wall section 190' followed axially to the rear by a sloped wall section 190". As shown, wall section 190' is more vertically oriented than wall section 190", with wall section 190' preferably extending transverse to the axial center line of the housing 102. Wall section 190' also preferably represents a majority or greater of the transverse length relative to wall section 190' with the axial run for wall section 190" preferably being greater than its radial rise. The sloping wall 190" provides for easier assertion of mixing module 112 (e.g., chamfer 151 to sloped surface 190" sliding while wall section 190' is of sufficient radial length to perform the abutment/locking function). FIG. 5A also illustrates the exterior surface of main body being in sliding friction contact with surface 188 of housing 102.

Rearward of the recess 188 defining housing surface there is provided a slight step up 194 (e.g., a 0.007 to 0.01 inch increase in going from D2 to D3). With a preferred common exterior wall surface, the different interior diameters are formed by different wall thickness to T3 and T4 and/or recess diameter differences. As seen from FIGS. 17 and 5 the minor step up 194 provides a forward limit for the Belleville stack, although spacer sleeve 124 preferably (in conjunction with the rear end cap 110) keeps the washer stack compressed and axially spaced from stepdown 194. The expansion in going from cavity 188 to more rearward cavity 193 also provides added radial clearance for accommodating the Belleville stack compression adjustments. Spacer 124 has an outer diameter generally conforming to D2 and axially bridges step down 194.

As seen from FIG. 7, main body portion 166 of mixing chamber 112 is preferably received entirely in housing recess 188 while Belleville washer stack 116 is received entirely in housing recess 193 defined by thickness T4. Spacer 124 preferably extends to opposite sides of step 194, and at the rearward end of housing 102 there is preferably provided back cap reception recess 192 of diameter (e.g., 0.5 to 0.6 in with 0.50 in being preferred) and thickness T5 (e.g., 0.2 to 0.3 in with 0.28 being preferred).

Recess 198 is designed in receive back cap 110, with cap 110 is dimensioned to occupy the area of recess 198 and extend inward into recess 186 and into contact with compression means 116. In this regard reference is made to FIG. 7 wherein L5 illustrates the axial length from the rear end of the housing into the rear end of compression means (in an assembled but non-operating state) 116 (e.g., 0.3 to 0.6 in or 0.45 in representing about 10 to 30% or more preferably 20% of the full axial length of mixing module 100 with 0% being at the back end). L6 illustrates the axial length from the rear end to the central axis of the solvent access opening 128 which also is preferably generally commensurate with the forward end of the compression means 116 and the rear end of spacer compression 114 (e.g., 0.9 to 1.4 inches or 40 to 60% with 50±5% being preferable with 0% again being the back end); L7 represents the contact interface between the front end of spacer sleeve and rear end of the mixing chamber 112

(e.g., 1.1 to 1.5 inches or 50 to 65%); L8 (FIG. 5) representing the distance from the rear end 106 of the housing and the central axis of housing inlet 140 (e.g., 1.3 to 1.9 inches or 55 to 85%) and L9 representing the full axial length of housing 102.

Reception recess 192 includes means for axial locking in position back cap 110, which means is preferably one that allows back cap removal without the need for special support fixtures like an arbor press in releasing the compression force and which can be tightened down by a simple tool to an operation location that compresses the compression means to the desired force level. In a preferred embodiment a threaded recess 192 is provided having relatively fine threads (e.g., 0.625-32 UN-class 2B for the rear and somewhat coarser 0.750-32 UN-23 for the front cap threads) for facilitating axially locking in position back cap 110 at a desired compression inducing setting.

Housing 102 also preferably includes a further rearward (e.g., rearward most) end recess 195 that steps up into larger diameter D5 (e.g., a 0.02 inch expansion) providing an annular sloping ridge 197 (facilitating assembly of back cap 110).

Figure 1:
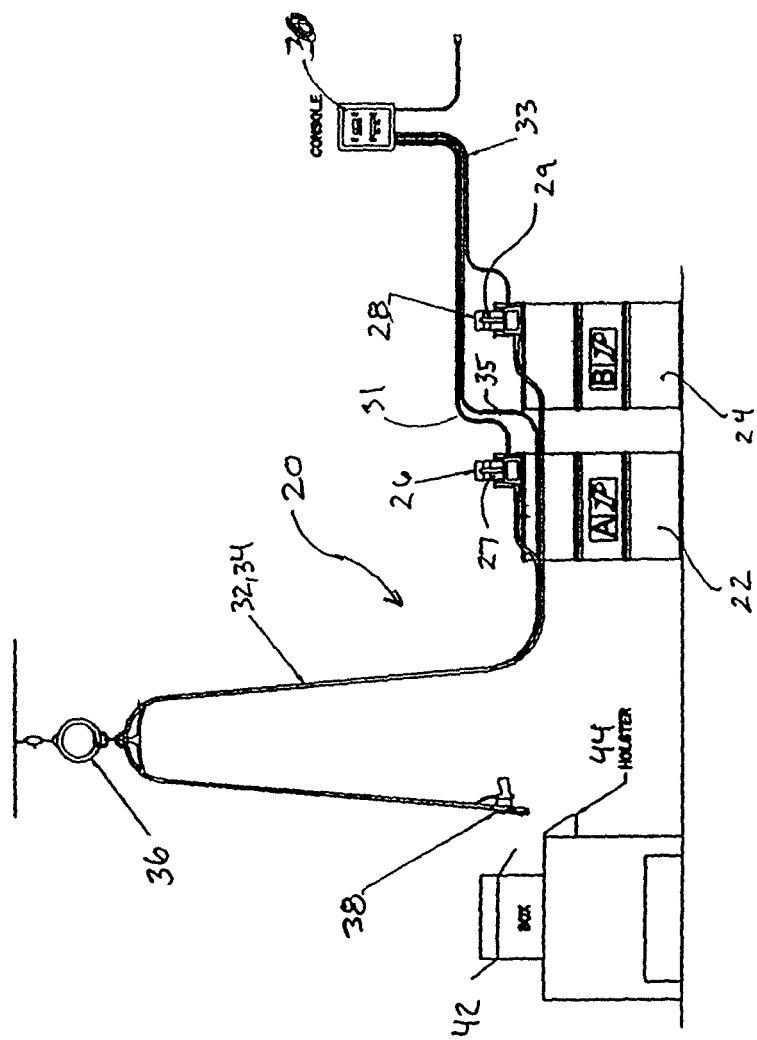
Figure 2:
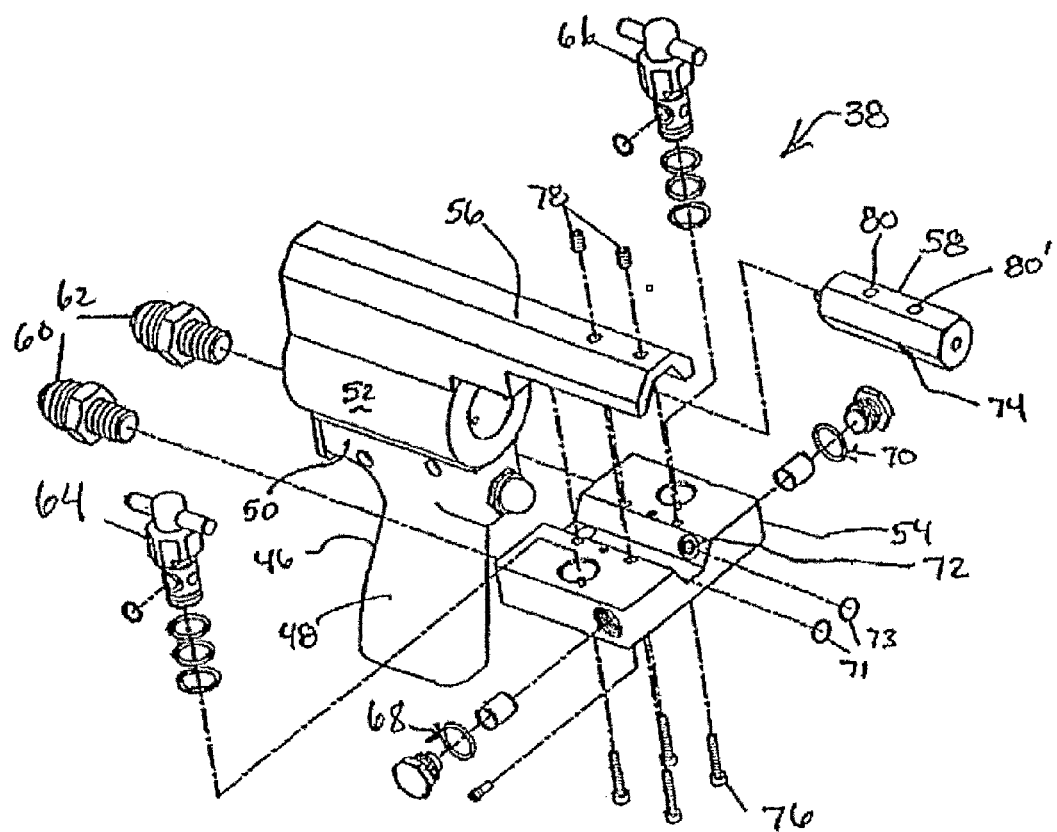
Figure 3A:
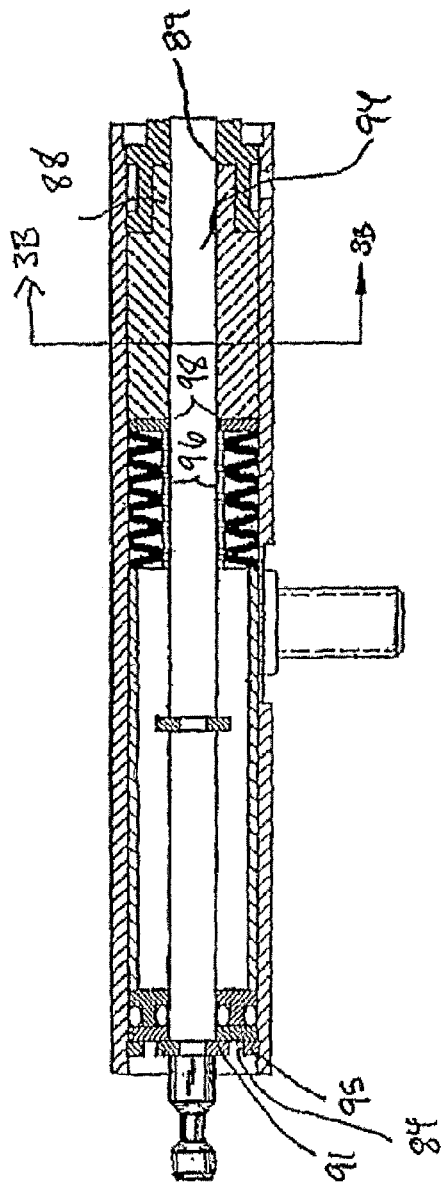
FIG. 3A shows a cross-sectional view of a prior art mixing chamber cartridge used in a hand held dispenser.
Figure 3B:
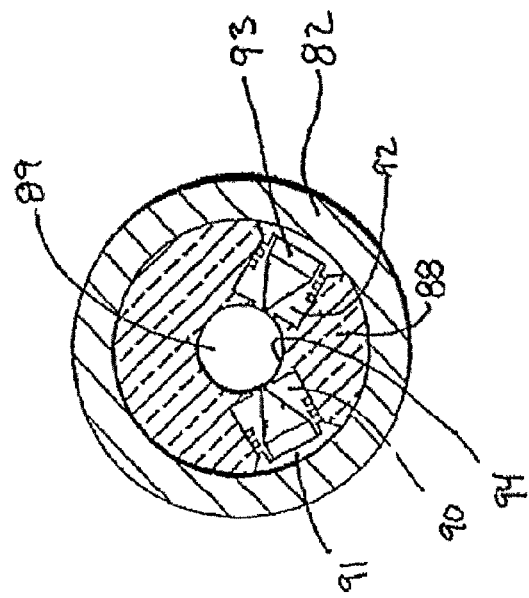
FIG. 3B shows a cross-sectional view taken along cross-section line 3B-3B-III in FIG. 3A.

As noted above, common prior art packaging foam mixing cartridges are assembled using clip rings on the back of a compression cap (see FIG. 3). In order to install the clip ring, the back cap must be forced into the Belleville washer stack, an action that requires about 200 lbf to accomplish. This method of assembly of the prior art mixing cartridges requires the use of machines like arbor presses and some special holding and alignment fixtures to put a mixing cartridge together making the process difficult. Also, assembly of prior art mixing cartridges like that in FIG. 3 cannot be done by hand tools normally found in a tool kit. These prior art designs are difficult to assemble, and even more difficult to disassemble, as the clip rings can be difficult to remove with the heavy spring load on the back cap.

In view of this, mixing module 100 of the present invention designed to be easier to assemble and disassemble. Also, under the Belleville stack compression forces imposed on prior art mixing chambers and mixing cartridges like that shown in FIG. 3, also tended to deform the front face of the housing when considering the desirability for thinness relative to purge rod front face passageway travel. This deformation can occur in prior art assemblies even after only moderate usage in the field. That is, the front cover of prior art mixing chambers are often swaged onto the housing and the design is not always strong enough to fully handle the loads imposed without deflecting. This deformation can cause a number of reliability problems for the mixing cartridge.

A preferred embodiment of the present invention includes the feature of having non-permanent, releasable securement means, with a preferred embodiment featuring threads (TH represents threads throughout the Figures and with MTH representing a meshing thread indication) provided on back cap reception recess 198 or some other releasable fixation means as in, for example, a key/slot engagement. The threads of the back cap reception recess are designed to mate with threads on the back cap 110 while front end housing threads are designed for threaded engagement with the front cap. Thus, a similar releasable securement relationship is provided at the front end as in the back end with a preferred embodiment featuring threads provided on, for example, the exterior surface 200 at the front end of housing 102 for threaded engagement with internal threads of face cap 102 (See FIGS. 19-21). This relationship at both the front and back of the mixing chamber allows a mechanic of minimal skills, without special fixture or exotic tools, to assemble and disassemble mixing module 100.

The assembly technique under the present invention "releasable securement" (e.g., threaded construction) also has a variety of other advantages. For example, the securement construction is much easier to assemble without the clip ring that holds the back cap in place against the pressure of the Belleville stack. The present invention also provides for easier field disassembly (e.g., a current foam production setting) as the securement construction makes it easier to rework or rebuilding at the foam production location without sending out to a special service location with special fixtures and the like for rework or rebuilding.

The present invention helps avoid this prior art tendency for the front cap of the housing to deform, or bulge due to the force imposed by the Belleville washer stack on the mixing chamber front face relative to sloped front face 154 being in contact with the interior, correspondingly sloped surface 207 of front cap 108 and the front end 104 of housing 102 being in contact with another (preferably transverse to cap central axial axis) wall section 209.

The manner of attachment and construction of front cap 108 on the front end of housing 102 provides for a more solid construction of the front cap. That is, because of the means for releasable connection, the front cap can be designed so that it avoids distortion under load. The present invention is thus designed to avoid the aforementioned problems associated with swaged front end caps, including difficulty in proper mixing chamber installation and alignment, strength parameters that are difficult to predict, and a tendency for deformation under high load. The ease of assembly and disassembly of the mixing module design, of the present invention in the production setting, also makes for easy assembly and disassembly both in the field and at a separate service location.

With the arrangement of the present invention, it is easier to install the mixing chamber from the front, instead of from the rear of the mixing module housing. In a preferred embodiment of the present invention featuring mixing chamber locking means 158 at the front end of the mixing chamber and a releasable securement face cap 108, there is provided the advantage of being able to install a mixing chamber from the front of the mixing module housing as compared to the more difficult rear installation in the prior art housing design. For example, the front loading potential makes it much easier to orient the ports in the mixing chamber into correct alignment with the through holes in the mixing module housing as compared to dropping a mixing chamber into and out of finger reach once released into the chamber.

Also, to facilitate the assembly and disassembly of the mixing module of the present invention, face cap 108 is preferably provided with a circumferential knurled surfacing for the preferred finger contact only tightening into position and releases for access (the rear or back cap tightening providing the higher level load upon the final stages of assembly.) In an alternate embodiment, diametrically opposing, smooth peripheral front cap surfaces for wrench contact and final tightening or releasing as in situations where external forces make for easier removal with a wrench or the like due to, for instance, hardened foam spill build up in the region.

FIGS. 19 to 21 provide three dimensional views of front or face cap 108 without full threading TH shown for draftperson convenience. Front cap 108 is shown to include interior threaded surface 109 which screws onto housing 102 along threaded surface 111 provided an exposed surface 200 and provides the front boundary for the mixing chamber. The hole 204 in the center is the exit for the liquid mixture of reacting precursors and also receives the forward most end of the valve rod when in its maximum forward state. As seen from FIGS. 5A, 8A and 13 the front face 206 of mixing chamber 112 features a conical taper on its interior surface with a preferred slope of angle β (e.g., 5° to 15°) and preferably 10°. Thus the edge 208 at the front end passageway 156 represents the most forward portion of mixing chamber 112 and the front face slopes rearward up to the forward most peripheral edge 160 of locking protrusion 158. With reference to 5A and FIG. 19 there can be seen that taper 207 formed on the inside surface of the mixing chamber face 154 matches the taper on interior surface of the front face 206 of the mixing chamber 112 (preferably upon initial contact but certainly after compression against that face by the compression means.) The taper in the front face of cap 108, allows the thickness of the face cap 108 at the center hole to be reduced, without sacrificing structural integrity. It is desirable to reduce this thickness to reduce the bonding area for urethane, since the Teflon material of the mixing chamber 112 cannot extend there. For example, FIG. 5A shown sloping front cap having a thinnest portion 211 at surface 204, an intermediate thickness section 289 due to the sloping wall at angle β and then the thicker outer region (preferably the axial thickness at surface 204 is 0.033 and the thickness at 211 is 0.027).

Face cap 108 is preferably made from stainless steel, and designed to minimize the deflection caused by the force generated by the Belleville washer on the mixing module. The tolerances on the face cap 108 and the housing itself are preferably held to a relatively high tolerance standard in comparison to what is possible with the swaged approach used by the mixing chamber shown in FIG. 3. The hole in the center of the front cap 108 is made corespendiaingly very concentric to the inside diameter of the housing, which means that the valving rod will be maintained centered on the hole in the front cap 108.

As seen in FIGS. 5, 7 and 22-24, at the rear end of housing 102 there is provided back cap 110. The compression cap or back cap 110 is screwed into the back threaded recess 210 at rear end 106 of housing 102 (FIG. 7), after all of the internal components are in place (although there is also the potential to close the front cap at the lest stage since both ends are accessible). The through hole 212 extending along the central axis of back cap 110 has undercut seal groove 134 to receive rear end O-ring 214 to seal the solvent into the chamber as the valving rod 118 cycles in and out.

FIGS. 22-24 further illustrate back cap 110 having two smaller blind holes 216, 218 on each side of the center of cap 110 which are used to rotate the cap as it is being threaded into the back of the housing. In a preferred embodiment, a spanner wrench (not shown) is provided for assembly and disassembly of the back cap relative to the housing. The spanner wrench has a two pin engagement end of the correct spacing to engage the two holes 216, 218 and a rear holding handle. Compression cap 208 compresses the Belleville washer stack as it is screwed into the housing. This action generates the compressive loads on the mixing module and generally involves a fairly high level of torque, so the spanner wrench is made sturdy. As shown in FIG. 5 and FIG. 24, back cap 110 has an interior cylindrical portion 217 sized for contact with the rear end of the compression means. A larger diameter intermediate section 219 is featured which is threaded for threaded attachment with corresponding housing threaded section 221. Between the threaded section 219 and interior portion 217 is an indented section 223. On the opposite side of section 219, there is an annular recess 225.

FIGS. 25 and 26 provide a view of an assembled 100 mixing module that shows the front cap 108, the back filler cap 110, the opposite ends of rod 118, and housing inlets or port holes 140, and 142. FIG. 25 further shows spanner wrench reception holes 216, 218 compression cap 110, and a full view of the capture loop 130 of rod 118, which is configured to attach to a ball screw used on existing hand held systems, although alternate designs such as an expanded cylindrical back end as described in an embodiment in the aforementioned U.S. patent application Ser. No. 10/623,858, filed on Jul. 22, 2003 and entitled Dispensing System and Method of Manufacturing and Using Same With A Dispenser Tip Management, now U.S. Pat. No. 7,182,221, which is incorporated herein by reference, is also representative of an alternate means for engagement with the mixing module of the present invention and with a suitably formed reciprocator. FIG. 25 also shows the two conical point position holes 136, 138 that are used to locate the mixing module in the dispenser manifold of an existing hand held system sold by Omni Packaging Inc. of Oklahoma, USA.

FIG. 26 illustrates solvent filler cap 126 (with an integral seal 217 as shown in FIG. 7) which offers significant advantages over the older designs in that it is easier to fill with solvent after assembly of the mixing module. It can be an awkward and messy procedure to fill the chamber with solvent in prior art mixing module designs such as those in FIG. 3A with back end loading in that the solvent has to be dispensed into the back of the mixing module, just prior to using an arbor press to compress the Belleville washer sufficiently to install an inside diameter clip ring on the back of the housing. This is not an easy or clean procedure, and it is difficult to know how much solvent is still inside after the job is done. A cross-section view of the solvent cap 126 is seen in FIG. 7 which shows how the solvent chamber is formed by the solvent recesses 122, 124, formed in the opposing back cap 110 and spacer sleeve 114, and the free space of housing 102 not occupied by the compression means positioned in the solvent chamber and between the spacer and back cap.

Under the present invention, mixing module 100 can be assembled in its entirely, and access to the solvent port it still made possible based on the relative positional relationship between, for example, the threaded solvent cap access port and the spacer sleeve's recessed areas (described below in greater detail). This ability to completely assemble mixing module 100 and then introduce the solvent via solvent cap 126 and the coordinated solvent chamber positioning and solvent chamber forming component portions are advantageous, for example, in allowing for easy, reliable and clean solvent filling to occur after the assembly is fully together. It is also easy to open the solvent cap for an initial check as to the solvent level and/or, less preferably, the back cap can be readily removed for a solvent check after the mixing module has been fully assembled. In prior art systems, it is often the case that there is significantly less solvent than originally thought to exist. For example, a solvent chamber may appear to be full after the initial filling operation, but a significant quantity of air can be trapped in the solvent chamber, as the viscosity of commonly used solvents can be quite high at room temperature to preclude a full fill under the prior art systems. To further help address this under fill problem there is carried out the step of heating the solvent to around 130° F. (e.g., above ambient as in 120-150° F.) before filling represents a preferred step.

Thus, under the present invention with the large diameter (e.g., 0.3 to 0.6 inch and preferably 0.425 inch) solvent access cap 126 (relative to a 2.3 inch housing length, for example), strategically positioned relative to the solvent chamber to provide solvent chamber access means, complete filling of the chamber is made easy to achieve without the air bubbles or overflow problems associated with prior art solvent chambers. Because the threaded solvent access hole allows for easy filling, there is less chance that air pockets will be trapped when the chamber is sealed. Since mixing module life is proportional to solvent quantity, eliminating any trapped air in the solvent chamber can extend the life of the mixing module. An easy refill on the solvent chamber without special tools is possible through use of the threaded solvent filler cap 126 as it can be readily removed with a small screwdriver applied to slot 216 anytime there is a desire to check conditions on the inside of the mixing module. The solvent chamber therefore can easily be refilled with solvent, and the cap re-installed. As shown in FIG. 7, O-Ring seal 217 is provided on the solvent cap to help in preventing solvent from leaking including during shipping.

Also, less leakage means longer life, and the sealed cap can be opened and resealed multiple times with minimal degradation in seal quality. With the solvent access means of the present invention the mixing module can be initially built and assembled at a manufactory or assembly site without solvent if long-term storage is required. There are applications that require long-term storage of system mixing modules in warehouses and/or the placement of mixing modules in harsh climates. In these situations, mixing module solvent, and any elastomeric seals in contact with the solvent, can degrade over time if pre-inserted at initial assembly. The present invention provides for either no solvent insertion at the time of assembly or ready access to replace the old solvent and seals after an extended period. This storage feature can be an advantage, for example, in some military applications, as well as in other environments and/or storage needs.

Also, solvent cap 126 can be opened and resealed multiple times with minimal degradation in seal quality and the mixing module can also be provided without solvent if long-term storage is required for use in those applications that require long term storage of system parts including mixing modules, in warehouses or even in harsh climates. Prior art mixing chambers with contained solvent, and any elastomeric seals in contact with solvent, will degrade over time. Thus, the ability of the present invention for post-manufacturing solvent supply or emptying and the refilling capability of the present invention makes the present invention advantageous for use in harsh environments or in prolonged storage state in military applications.

FIGS. 27 and 28 provide different perspective views of spacer sleeve 114, which includes solid cylindrical forward section 218 which is integral with forward compression contact face 220 which is placed in contact with the mixing modules rear end, having valve rod reception opening 224, and at its rear end 223 (or compression means contact end) there is provided one or more spacer slots 228 defined between spacers 226. At least one spacer slots 228 is preferably aligned with solvent housing access opening(s) 128. In a preferred embodiment, there are multiple spacers 226 (e.g., 3-10 with 6 preferred) separated by arch-slots 228 which provide ready access from solvent opening 128 into solvent sleeve reception cavity 122. The size of the solvent opening 128 (see above) and/or the dimensional circumferential width and axial depth of the spacer slots 228 are designed to provide solvent introduction access to solvent chamber. As spacer sleeve 114 is subjected to the load of the compression means, spacer 226 (and the remaining surfaces as well) and thus has a thickness and configuration designed to handle such loads. In addition, the interior side edges 227, 729 of slots preferably diverge from each other going radially inward.

FIGS. 29A to 34 provide a variety of views illustrating the geometry of a preferred chemical inlet port (such as 182 and 184 shown in FIG. 4) designed to provide accurate chemical injection and to provide a configuration that coincides with the geometry of the receiving port holes 174, 176, the exterior surface of the mixing chamber, and the mixing chamber surface of the mixing chamber cavity at the cross-section of the ports. FIGS. 29A to 29G provides rotation sequence (at 15° angle intervals) with a front elevational view in FIG. 29A and FIG. 29G provides a top plan view with a 90° rotation relative to an end view in axial direction of elongation of the mixing chamber. FIG. 30A provides a view similar to FIG. 29A, but with the port having been rotated 45° along its central axis of elongation to the present a front elevation view of the port from an end view of the mixing chamber.

FIG. 33 provides a cross-sectional view of port 182 (or 184—each being preferably of the same configuration and formed of, for example, a stainless steel) taken along cross-section line F-F in FIG. 30A. FIG. 34 provides a cross-sectional view of port 182 taken along cross-section line G-G in FIG. 29A. FIG. 34 illustrates upwardly convex surface of radius RA2 having a radius of curvature (e.g., 0.246) designed to coincide with the radius of curvature of the exterior circumference of mixing module 100 (e.g., which has a diameter of about 0.5 inches (+/−0.1)) so as to avoid any discontinuance in surface until coming to the edge in 231 of conical port section 230 which has a depth $H_1$ of about 0.066 to 30 to 60% of $H_2$ (the maximum height of port 182 which is preferably about 0.151 inch and more preferably about 40%). As seen from the various views upper annular rim 232 undergoes a rise and lower sequence in going from generally a first convex raised area or (e.g. quadrant) 234, first recessed concave area (e.g., quadrant) 236, second convex raised area (e.g., quadrant) 238 and second recessed concave area (e.g. quadrant) 240 with a smooth, continuous curvature in going from one to the next along the entire annular rim.

A comparison of FIGS. 33 and 34, shows edging 231 lying essentially midway between the upper point of height $H_3$ (which is the maximum height reached by the edging of conical section 230 which conforms to the maximum height of annular rim 232 and is preferably about 0.072 inch) and an upper point of height H5 (e.g., 0.058 inch) which is the minimum height level of the annular rim. Height H4 is preferably about 0.079 inch. As seen from a comparison of FIGS. 33 and 34, annular rim 232 goes from, horizontal orientation, to and gradually changes in orientation from, the horizontal to the slope down from a higher interior end to a lower exterior end. Edge 231 of conical port section 230 has a maximum inlet diameter D of about 0.114 inch for example which conically (e.g., angle $B_2$ of 25 to 35° slope and more preferably 30°) decreases down to the cylindrical passageway diameter $D_2$ of about 0.03 inch, for example. The diameter of the passageway is preferably made as small as possible to maximize output velocity with the limiting factor being the operating pressure of the system and the pump capacity.

Figure 31A:
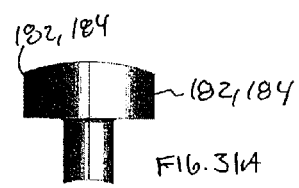
Figure 29B:
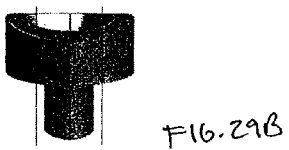
Figure 30B:
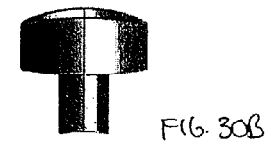
Figure 31B:
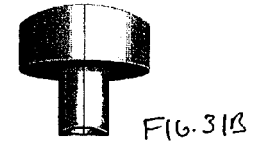
Figure 29C:
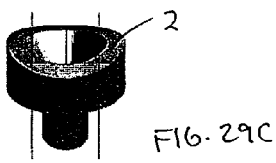
Figure 30C:
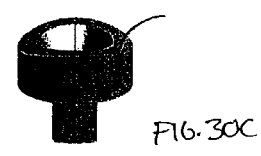
Figure 31C:
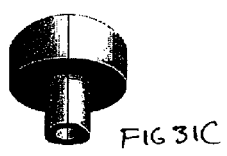
Figure 29D:
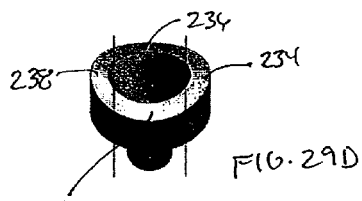
Figure 30D:
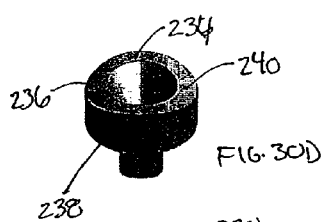
Figure 31D:
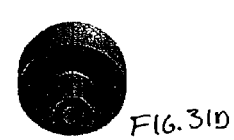
Figure 29E:
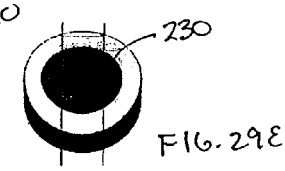
Figure 30E:
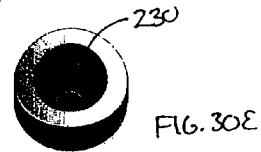
Figure 31E:
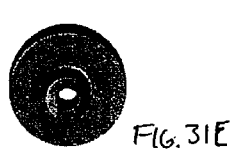
Figure 29F:
Figure 30F:
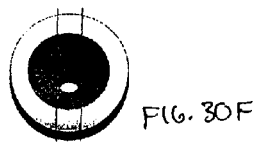
Figure 31F:
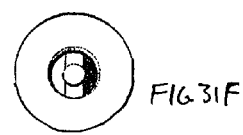
Figure 29G:
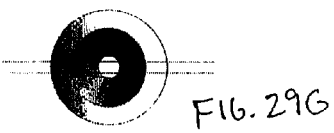
Figure 30G:
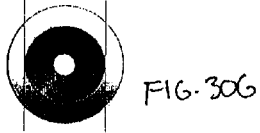

FIG. 33 shows conical port section 230 with concave conical edge portion 242 having a compound curve configuration RA1 to match the mixing chamber configuration. FIGS. 33 and 34 and the perspective Figures such as FIG. 31A show a rotation of port 182 (or 184) from a front elevation to bottom plan view showing the curving or sloping bottom annular rim 242 of port 182. Upper annular rim 232 has a minimum width W1 of 0.02 to 0.03 inch (or 0.025 inch preferred), for example, an enlarged width W2 of 0.024 to 0.034 (0.029 preferred), for example, while bottom annular rim W3 of 0.016 to 0.026 inch (0.016 inch preferred) for example, with W3 being a horizontal orientation. In going from the orientation of FIG. 33 to that of FIG. 34 featuring two sloping down rim sections 244, 246 of angle A2 about 15° (±5°) preferably with height H7 (e.g., 0.005 inch) for the extension down from the uppermost edge of the outlet 235 of port 182 to the lowermost edge of that outlet. As illustrated, the downstream end of conical port section 230 opens into cylindrical passageway 233 at about the transition from the larger head 239 to port extension 237. Between the sloped sections 244 and 246 is planar section 245 with the outlet port extending entirely across planar section 245 and partially into sloped section 244, 246 with the combination of flat surfaces represented by RA3.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A fluid mixing module, comprising:
   a housing;
   a mixing chamber formed of a cold flow material and having at least one fluid inlet port and a rod passageway;
   a rod received within said mixing chamber; and
   a compression device positioned within said housing and in a compressive relationship with said mixing chamber, wherein
   said mixing chamber and said housing have a male/female locking relationship that generates a movement-suppressing pressing-force between male and female members of the male/female locking relationship, at least during a valving rod retraction operation in the presence of a rod-stick relationship, that prevents a rearward movement of said mixing chamber relative to said housing during retraction of the rod from a more forward position in said mixing chamber to a more rearward position,
   said housing has open front and rear ends and said mixing module further comprises front and rear closure caps releasably secured to said housing, and
   the compressive relationship of said compression device with said mixing chamber biases said mixing chamber toward said front end.

2. The mixing module of claim 1 wherein said male/female locking relationship includes an annular male projection on one of said housing and mixing chamber and a corresponding female recess receiving said male projection on an opposite one of said housing and mixing chamber.

3. The mixing module of claim 1 wherein said mixing chamber has an enlarged forward end forming a male locking member and said housing has a recess formed in the front end for receiving said enlarged forward end of said mixing chamber.

4. The mixing module of claim 1 wherein each of said front and rear closure caps are threadably secured to said housing.

5. The mixing module of claim 4 further comprising a solvent access closure cap in threaded engagement with a wall of said housing.

6. A polyurethane foam dispenser, comprising:
   the fluid mixing module as recited in claim 1;
   a dispenser body which receives said mixing module; and
   a rod adjustment device connected to said rod for forward and rearward adjustment of said rod within said mixing chamber.

7. A fluid mixing module, comprising:
   a housing;
   a fluid mixing chamber formed of a cold flow material and having a rod passageway and a pair of fluid inlet ports opening into said rod passageway;
   a valving rod received within said mixing chamber and adjustable between a fluid inlet ports seal off mode and a fluid inlet ports free passage mode; and
   a compression device positioned within said housing for compressing the cold flow material of said mixing chamber, wherein
   said mixing chamber and said housing a male/female locking have arrangement that generates a movement-suppressing pressing-force between male and female members of the male/female locking arrangement that, at least during a valving rod retraction operation in the presence of a rod-stick relationship, prevents adjustment of said mixing chamber back into said compression device when said valving rod and mixing chamber temporarily join together in a dispensing operation, and a front cap provided at a fluid discharge front end of said housing, said front cap having an interior surface in which a fluid discharge opening is formed,
   said housing comprises a cavity in which said compression device is received, and said compression device biases the mixing chamber as to force a forward end of said mixing chamber into compressive contact with the interior surface of said front cap.

8. A method of assembling a mixing module comprising:
   inserting into a housing:
      (i) a compression device,
      (ii) a reciprocating rod, and
      (iii) a mixing chamber, with the mixing chamber receiving the reciprocating rod and being placed in a state of compression by the compression device;
   setting a male/female locking arrangement between the mixing chamber and the housing that generates a movement-suppressing pressing-force between male and female members of the male/female locking arrangement, at least during a reciprocating rod retraction operation in the presence of a rod-stick relationship, to preclude a mixing chamber rearward movement despite the rod-stick relationship between the reciprocating rod and the mixing chamber during a pullback of said reciprocating rod relative to the mixing chamber; and
   releasably securing a front cap and a rear cap to said housing, wherein
   the state of compression of the mixing chamber by the compression device is one where the compression device presses the mixing chamber against an inner surface of the front cap.

9. The method of claim 8 further comprising inserting solvent into a solvent opening formed in the housing and plugging the solvent opening with a solvent cap.

10. A method of dispensing a foam material which has a chemical bond characteristic upon hardening, comprising:
   feeding fluid foam precursor material to a mixing chamber received within a housing of a dispenser with said mixing chamber having at least one inlet for foam precursor and at least one outlet for foam precursor;
   adjusting a valving rod received in said mixing chamber from a fluid block position to a fluid release position, wherein
   said mixing chamber is biased in a dispensing-outlet-direction of the dispenser, at least during a valving rod retraction toward the fluid release position, by a predetermined compressive force from a compression device positioned within said housing, and during adjustment of the valving rod there is prevented movement of the mixing chamber relative to said housing by way of a male-female lock relationship between said mixing chamber and housing, the lock relationship being sufficient to prevent a relative rearward movement between the mixing chamber and housing during valving rod retraction toward the fluid release position regardless of the presence of a chemical bond between the valving rod and the mixing chamber that is at least temporarily greater than the predetermined compressive force of said compression device on said mixing chamber; and releasing foam material from the outlet of said mixing chamber.

11. A fluid dispenser module, comprising:

a housing;

a fluid reception chamber formed of a cold flow material and provided within said housing and having a rod passageway formed in the fluid reception chamber and at least one outlet and one inlet port in fluid communication with said rod passageway, said fluid reception chamber having an upstream end and a downstream end relative to fluid flow out of the dispenser module, the upstream end being within the housing;

a rod received in said rod passageway and adapted to travel forward and backward within the fluid reception chamber;

a compression device that generates a compressive force on the upstream end of said fluid reception chamber as to bias the fluid reception chamber in a downstream direction, wherein said fluid reception chamber has a male/female locking arrangement relative to said housing that generates a movement-suppressing pressing-force between male and female members of the male/female locking arrangement, at least during a rod retraction operation in the presence of a rod-stick relationship, which prevents the fluid reception chamber from rearward adjustment in conjunction with an adjustment in position of said rod from a forward to rearward direction in the presence of a bond relationship with said fluid reception chamber, a front cap is provided at a front fluid discharge end of said housing and having an interior surface in which a fluid discharge opening is formed, and said housing defines a cavity in which said compression device is received, and said compression device biases a first end of the fluid reception chamber as to force a second end of the fluid reception chamber into compressive contact with the interior surface of said front cap.

12. The dispenser module of claim 11 wherein said male/female locking arrangement includes an annular male projection and an annular female reception arrangement provided between said fluid reception chamber and said housing.

13. The dispenser module of claim 11 wherein said male/female locking arrangement includes a circumferentially continuous annular projection in one of said housing and fluid reception chamber and a corresponding receiving recess formed in the other of said housing and fluid reception chamber.

14. The dispenser module of claim 11 wherein said male/female locking arrangement includes a projection that is formed on said fluid reception chamber and is formed of a cold flow material together with a cold flow material main body of said fluid reception chamber and said projection is positioned closer to a first end of said fluid reception chamber than a second end.

15. The dispenser module of claim 14 wherein said projection and main body are formed as an integrated, monolithic unit.

16. The dispenser module of claim 15 wherein said first end is a front discharge end of said fluid reception chamber and wherein said projection is one of a circumferentially continuous projection or a plurality of circumferentially arranged projection extensions.

17. The dispenser module of claim 16 wherein said projection is formed at a forwardmost end portion of said fluid reception chamber.

18. The dispenser module of claim 11 wherein said male/female locking arrangement includes an annular projection extending radially off a main body of said fluid reception chamber and said main body is formed of a fluorinated hydrocarbon polymer material.

19. The mixing module of claim 1 wherein said compression device is received within a cavity formed in said housing and is in a biasing relationship with a first end of said mixing chamber, and said front closure cap is in contact with a second, opposite end of said mixing chamber.

20. The mixing module of claim 19 wherein the first end of the mixing chamber defines an entrance opening that receives the rod and the second end defines a discharge outlet for discharging fluid received in the mixing chamber.

21. The mixing module of claim 1 wherein said front closure cap is secured to said housing at a discharge end of said housing, and said front closure cap has a fluid discharge opening and an internal surface in which said fluid discharge opening is formed, the internal surface of said front closure cap being in compressive contact with a free end surface of the mixing chamber and a discharge outlet of the mixing chamber is formed in the free end surface of the mixing chamber.

22. The mixing module of claim 21 wherein the internal surface of said front closure cap is oblique as to form a thinner thickness region in an area surrounding the fluid discharge opening, and the free end surface of the mixing chamber has an oblique surface conforming to the oblique internal surface of the front closure cap.

23. The mixing module of claim 1 wherein said rear closure cap is adjustably received at a rear, non-fluid discharge end of said housing, and extends internally within the housing into contact with the compression device, such that adjustment of the closure cap will adjust a compression level of the compression device.

24. The method of claim 8 wherein a fluid discharge opening is formed in the inner surface of the front cap, and the compression device presses a first end of the mixing chamber against the inner surface of the front cap by applying a compressive force to a second end of the mixing chamber opposite from the first end.

25. The method of claim 8 wherein said rear cap is adjustably secured to a rear, non-fluid discharge end of the housing such that adjusting the rear cap will act to vary a compression level in said compression device.

26. The dispenser module of claim 11 further comprising a rear housing closure cap adjustably received at a rear, non-fluid discharge end of said housing, and which extends internally within the housing into contact with the compression device, such that adjustment of the rear housing closure cap will adjust a compression level of the compression device.

27. The mixing module of claim 1 wherein
the compressive relationship of said compression device with said mixing chamber biases said mixing chamber toward said front end at least during a retraction of the rod from a more forward position in said mixing chamber to a more rearward position.

28. The fluid mixing module of claim 7 wherein
said compression device is configured to bias the mixing chamber as to force the forward end of said mixing chamber into compressive contact with the interior surface of said front cap, at least during a valving rod retraction.

29. The method of claim 8 wherein
the state of compression of the mixing chamber by the compression device is one where the compression device presses the mixing chamber against an inner surface of the front cap at least during a pullback of said reciprocating rod relative to the mixing chamber.

30. The dispenser module of claim 11 wherein
said compression device biases the first end of the fluid reception chamber as to force the second end of the fluid reception chamber into compressive contact with the interior surface of said front cap at least during an adjustment of said rod from a forward to rearward direction.

* * * * *